(12) United States Patent
Shimizu et al.

(10) Patent No.: US 9,424,468 B2
(45) Date of Patent: Aug. 23, 2016

(54) MOVING OBJECT PREDICTION DEVICE, HYPOTHETICAL MOVABLE OBJECT PREDICTION DEVICE, PROGRAM, MOVING OBJECT PREDICTION METHOD AND HYPOTHETICAL MOVABLE OBJECT PREDICTION METHOD

(75) Inventors: Tsukasa Shimizu, Aichi-gun (JP); Yoshihiro Ohama, Nisshin (JP); Shinichi Nagata, Yokohama (JP); Masayuki Shimizu, Susono (JP); Jun Sakugawa, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 418 days.

(21) Appl. No.: 13/821,147

(22) PCT Filed: Sep. 8, 2011

(86) PCT No.: PCT/JP2011/070518
§ 371 (c)(1),
(2), (4) Date: Apr. 4, 2013

(87) PCT Pub. No.: WO2012/033173
PCT Pub. Date: Mar. 15, 2012

(65) Prior Publication Data
US 2013/0223686 A1 Aug. 29, 2013

(30) Foreign Application Priority Data

Sep. 8, 2010 (JP) .................. 2010-201214

(51) Int. Cl.
*G06K 9/00* (2006.01)
*G08G 1/16* (2006.01)
(52) U.S. Cl.
CPC ........ *G06K 9/00624* (2013.01); *G06K 9/00362* (2013.01); *G06K 9/00805* (2013.01); *G08G 1/166* (2013.01)

(58) Field of Classification Search
CPC .......... G06K 9/00362; G06K 9/00624; G06K 9/00805; G08G 1/166
See application file for complete search history.

(56) References Cited

U.S. PATENT DOCUMENTS 7,602,945 B2 * 10/2009 Kubo et al. .................. 382/104
7,710,248 B2 * 5/2010 Greene .................. G08G 1/166
340/436

(Continued)

FOREIGN PATENT DOCUMENTS

| JP | 2005-173703 A | 6/2005 |
| JP | 2007-233646 A | 9/2007 |
| JP | 2008-238831 A | 10/2008 |

*Primary Examiner* — Katrina Fujita
(74) *Attorney, Agent, or Firm* — Kenyon & Kenyon LLP

(57) ABSTRACT

A position, behavior state and movement state of a moving object are detected, together with plural categories of track segment region and stationary object regions, using an environment detection section. A presence probability is applied to the detected track segment regions and stationary object regions and a presence probability map is generated, using a map generation section. A moving object position distribution and movement state distribution are generated by a moving object generation section based on the detected moving object position, behavior state and movement state, and recorded on the presence probability map. The moving object position distribution is moved by a position update section based on the moving object movement state distribution. The moved position distribution is changed by a distribution change section based on the presence probabilities of the presence probability map, and a future position distribution of the moving object is predicted on the presence probability map. Consequently, the future position of the moving object can be predicted with good precision under various conditions.

19 Claims, 27 Drawing Sheets

(56) References Cited

U.S. PATENT DOCUMENTS

| | | | |
|---|---|---|---|
| 7,966,127 B2 * | 6/2011 | Ono et al. | 701/300 |
| 8,548,643 B2 * | 10/2013 | Asano | G08G 1/166 701/1 |
| 8,599,252 B2 * | 12/2013 | Komoto | G06T 7/2006 348/135 |
| 2005/0216274 A1 * | 9/2005 | Kim | 704/276 |
| 2008/0097699 A1 * | 4/2008 | Ono | 701/300 |

* cited by examiner

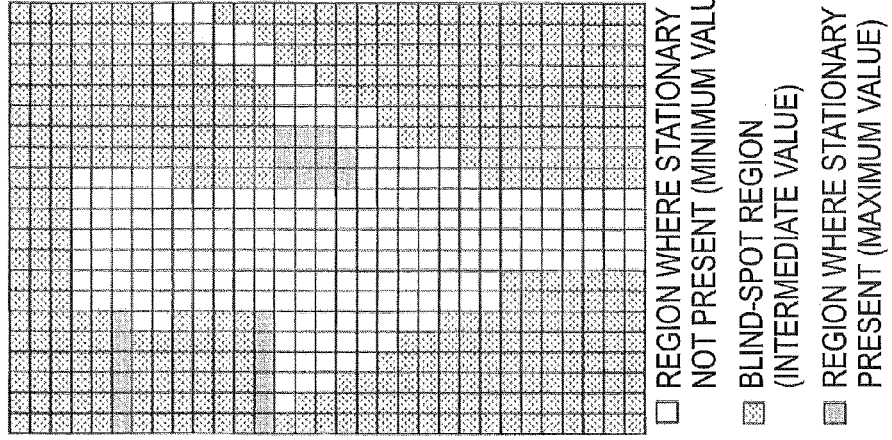
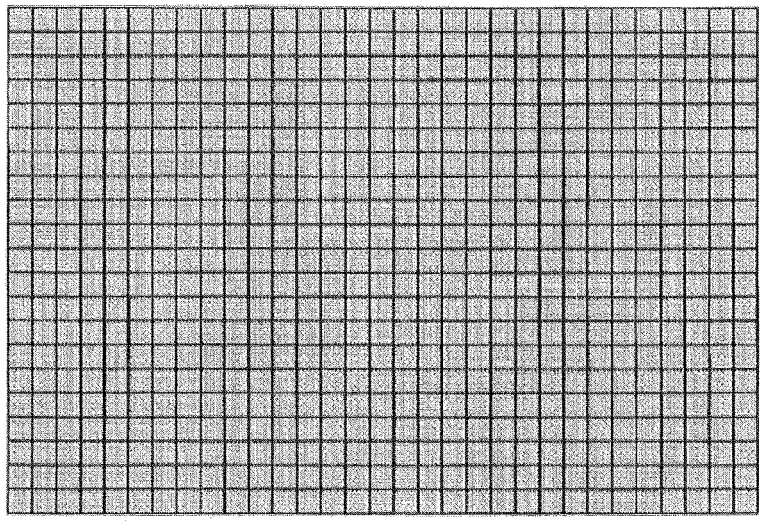
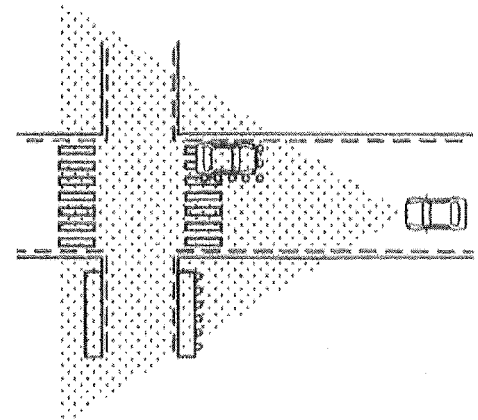

FIG.5

| TRACK SECTION | CONDITION | PRESENCE PROBABILITY |
|---|---|---|
| ROAD | SHORT TRACK | 0.8 |
| | 1 VEHICLE LANE IN EACH DIRECTION | 0.5 |
| | 2 VEHICLE LANES IN EACH DIRECTION | 0.25 |
| | 3 OR MORE VEHICLE LANES IN EACH DIRECTION | 0.0 |
| | CENTRAL RESERVATION PRESENT | 0.0 |
| SIDEWALK | - | 1.0 |
| PEDESTRIAN CROSSING | NO PEDESTRIAN LIGHTS | 1.0 |
| | PEDESTRIAN LIGHTS (GREEN) | 1.0 |
| | PEDESTRIAN LIGHTS (RED) | 0.0 |

FIG.6

| TRACK SECTION | CONDITION | PRESENCE PROBABILITY |
|---|---|---|
| ROAD | VEHICLE LANE OF VEHICLE ITSELF | 1.0 |
| | ONCOMING VEHICLE LANE | 0.25 |
| SIDEWALK | - | 0.0 |
| PEDESTRIAN CROSSING | NO PEDESTRIAN LIGHTS | 1.0 |
| | PEDESTRIAN LIGHTS (GREEN) | 0.0 |
| | PEDESTRIAN LIGHTS (RED) | 1.0 |
| STATIONARY OBSTACLE OBJECT | - | 0.0 |

FIG.8

| AVERAGE VELOCITY (m/s) CONDITION | VARIANCE/COVARIANCE (m²/s²) |
|---|---|
| VELOCITY = 0.0 | $\sigma x^2 = 0.30^2$, $\sigma y^2 = 0.30^2$, $\sigma xy = 0.0$ |
| 0.0 < VELOCITY ≤ 0.5 | $\sigma x^2 = 0.20^2$, $\sigma y^2 = 0.20^2$, $\sigma xy = 0.0$ |
| 0.5 < VELOCITY ≤ 1.5 | $\sigma x^2 = 0.10^2$, $\sigma y^2 = 0.10^2$, $\sigma xy = 0.0$ |
| 1.5 < VELOCITY | $\sigma x^2 = 0.05^2$, $\sigma y^2 = 0.05^2$, $\sigma xy = 0.0$ |

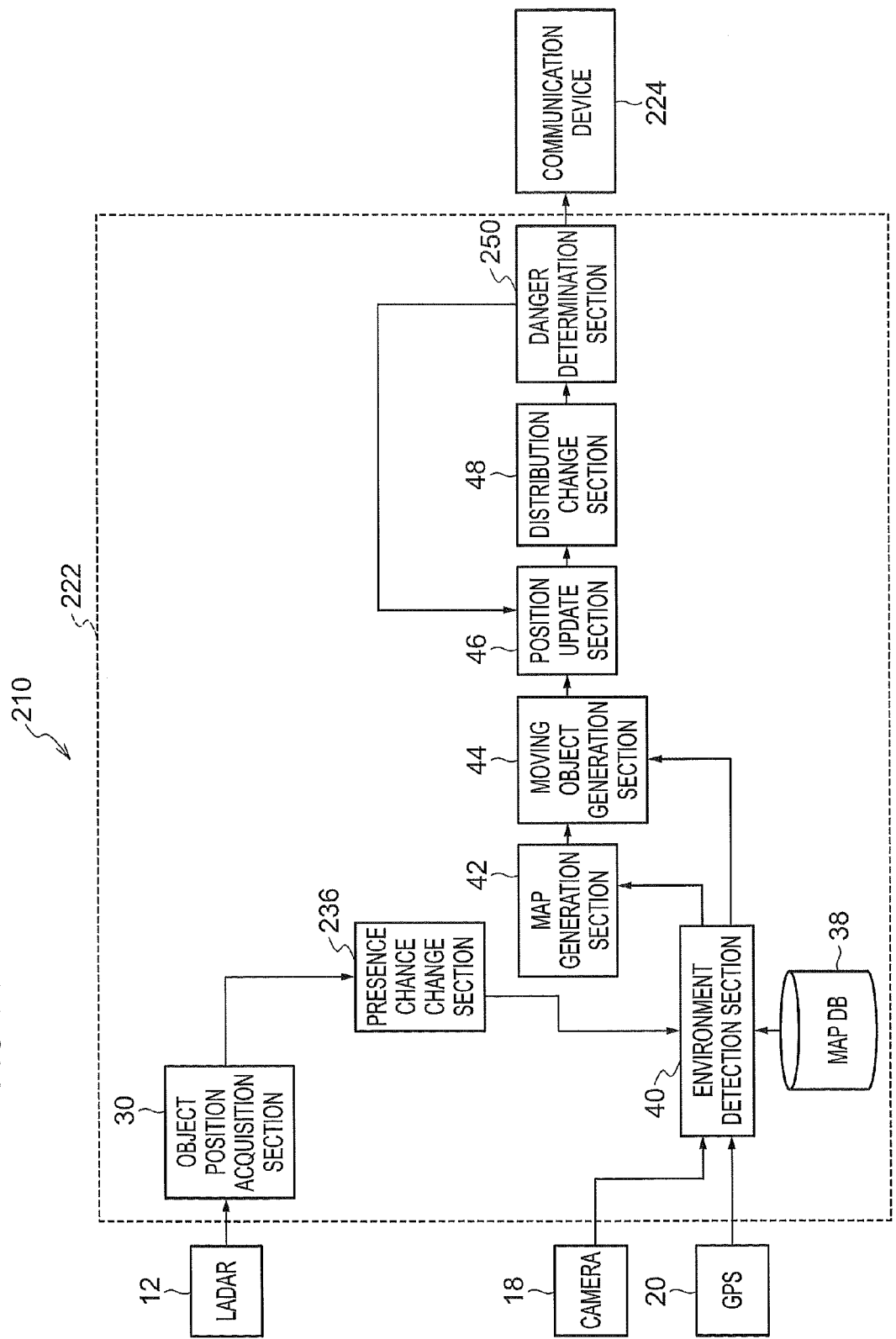

FIG.16

```
DANGER DETERMINATION PROCESSING ROUTINE
        ↓
120 — ACQUIRE FORWARD IMAGE AND POSITION DATA
        ↓
122 — DETECT TRAFFIC ENVIRONMENT CONDITIONS
        ↓
124 — ACQUIRE LOCAL MAP
        ↓
125 — DETECT STATIONARY OBJECT REGION
        ↓
126 — GENERATE PRESENCE PROBABILITY MAP
        ↓
130 — GENERATE MOVING OBJECT DATA
        ↓
132 — n = 1
        ↓
302 — MOVE POSITION DISTRIBUTION
        ↓
304 — CHANGE POSITION DISTRIBUTION
        ↓
306 — COMPUTE DANGEROUSNESS
        ↓
140 — IS DANGEROUSNESS A THRESHOLD VALUE OR GREATER? — N →
        ↓ Y
142 — DISPLAY WARNING INFORMATION
        ↓
144 — n < N? — Y → 146 — n = n + 1
        ↓ N
        END
```

FIG.18

| ROAD | DIRECTION | TYPE | FREQUENCY |
|---|---|---|---|
| A | UP | PEDESTRIAN | 121 |
| A | UP | BICYCLE | 83 |
| A | UP | MOTORCYCLE | 22 |
| A | UP | NORMAL VEHICLE | 50 |
| A | UP | HGV | 5 |
| A | ACROSS | PEDESTRIAN | 323 |
| A | ACROSS | BICYCLE | 98 |
| A | ACROSS | MOTORCYCLE | 2 |
| A | ACROSS | NORMAL VEHICLE | 0 |
| A | ACROSS | HGV | 0 |
| A | DOWN | PEDESTRIAN | 84 |

| | Peripheral Data Input | | | | | | | | | | | | Postulated Output |
|---|---|---|---|---|---|---|---|---|---|---|---|---|---|
| Blind-Spot Generated Object | Blind-Spot Positional Relationship | Pedestrian Crossing | Traffic Signal | Temporary Stop Line | Overtaking Restriction | Speed Limit | Road Scale | Cross-Road | Sidewalk | Barrier | Road Profile | Own-Vehicle Velocity | Movable Object to be Postulated in Blind-Spot Region |
| Normal Vehicle | Own-Vehicle Lane | Absent | Absent | Present | Present | 30 km/h | Single Track | Present | Absent | Barrier (RHS) | Straight | 0-10 km/h | Pedestrian |
| Normal Vehicle | Own-Vehicle Lane | Absent | Absent | Present | Absent | 30 km/h | Single Track | Present | Absent | Barrier (RHS) | Straight | 0-10 km/h | Two-Wheeled Vehicle |
| Electricity Pylon | Own-Vehicle Lane | Absent | Absent | Absent | Absent | 30 km/h | Single Track | Absent | Absent | Barrier (RHS) | Straight | 0-10 km/h | Pedestrian |
| Vehicle | Own-Vehicle Lane | Absent | Absent | Absent | Absent | 40 km/h | 1 Vehicle Lane Each Way | Absent | Present | Barrier (RHS) | Straight | 10-20 km/h | Pedestrian |
| HGV | One-Adjacent Vehicle Lane | Absent | Absent | Absent | Present | 40 km/h | 1 Vehicle Lane Each Way | Absent | Present | Barrier (RHS) | Straight | 10-20 km/h | Pedestrian |
| HGV | One-Adjacent Vehicle Lane | Absent | Absent | Absent | Present | 50 km/h | 1 Vehicle Lane Each Way | Absent | Absent | Barrier (RHS) | Straight | 20-30 km/h | Normal Vehicle |
| HGV | One-Adjacent Vehicle Lane | Absent | Absent | Absent | Prohibited | 60 km/h | 2 Vehicle Lanes Each Way | Absent | Present | Absent | Straight | 40-50 km/h | Pedestrian |
| HGV | Own-Vehicle Lane | Absent | Absent | Absent | Prohibited | 60 km/h | 2 Vehicle Lanes Each Way | Absent | Present | Absent | Straight | 50-60 km/h | None |
| Sidewall | One-Adjacent Vehicle Lane | Absent | Absent | Absent | Prohibited | 40 km/h | 1 Vehicle Lane Each Way | Present | Absent | Absent | Straight | 30-40 km/h | Bicycle |
| Sidewall | One-Adjacent Vehicle Lane | Absent | Absent | Absent | Prohibited | 30 km/h | Single Track | Present | Absent | Absent | Straight | 20-30 km/h | Bicycle |
| HGV | One-Adjacent Vehicle Lane | Absent | Absent | Absent | Prohibited | 50 km/h | 2 Vehicle Lanes Each Way | Absent | Present | Absent | Straight | 10-20 km/h | Pedestrian |

FIG.23

| BLIND-SPOT DISTANCE d | PRESENCE PROBABILITY FOR SETTING IN BLIND-SPOT REGION | |
|---|---|---|
| | PEDESTRIAN PRESENCE PROBABILITY | VEHICLE PRESENCE PROBABILITY |
| $0 < d \leq D \times 1$ | 1.0 | 0.2 |
| $D \times 1 < d$ | 0.8 | 1.0 |

FIG.24

| BLIND-SPOT DISTANCE d | POSTULATED HYPOTHETICAL MOVABLE OBJECT |
|---|---|
| $0 < d \leq D \times 2$ | PEDESTRIAN |
| $D \times 2 \leq d$ | VEHICLE |

VEHICLE ITSELF

MOVING OBJECT PREDICTION DEVICE, HYPOTHETICAL MOVABLE OBJECT PREDICTION DEVICE, PROGRAM, MOVING OBJECT PREDICTION METHOD AND HYPOTHETICAL MOVABLE OBJECT PREDICTION METHOD

This is a 371 national phase application of PCT/JP2011/070518 filed 8 Sep. 2011, which claims priority to Japanese Patent Application No. 2010-201214 filed 8 Sep. 2010, the contents of which are incorporated herein by reference.

TECHNICAL FIELD

The present invention relates to a moving object prediction device, a hypothetical movable object prediction device, a program, a moving object prediction method, and a hypothetical movable object prediction method. The present invention particularly relates to a moving object prediction device, a program and a moving object prediction method that predict a future position of a moving object, and to a hypothetical movable object prediction device, a program and a hypothetical movable object prediction method that predict a future position of a hypothetical movable object.

BACKGROUND ART

Object progression path prediction devices are known that change positions that an object might take with the passage of time, generate a spatiotemporal trajectory, and perform probability prediction of the progression path of the object (Japanese Patent Application Laid-Open (JP-A) No. 2007-233646). In such an object progression path prediction device, a trajectory is generated that can secure safety under conditions that might arise in reality.

Moreover, an online risk training system is known in which the system autonomously trains with experience in actual environments, and is capable of ascertaining the dangerousness of multiple external environments (JP-A No. 2008-238831). This online risk training system is realized to automatically extract feature amounts of images and learn their relationships to driving operations of a driver.

Moreover, a crossroad collision prevention device is known that prevents vehicle collisions by warning a driver when a vehicle is in a situation with a high danger of collision at a crossroad or traffic merge point (JP-A No. 2005-173703). This crossroad collision prevention device is realized by holding a database of accident states at crossroads, and performing searches and applying scoring based on sensor data.

DISCLOSURE OF INVENTION

Technical Problem

However, in the technology disclosed in JP-A No. 2007-233646 described above, limitations to the range in which a moving object can move are not clear, and since movement of the moving object is possible everywhere, there is the issue that prediction of the future position of the moving object cannot be made with good precision.

Moreover, in the technology disclosed in JP-A No. 2008-238831 described above, since risk evaluation cannot be performed unless there is a tendency for the driver to perform an operation so as to change the driving action, there is the issue that sometimes the future position of a moving object cannot be predicted.

Moreover, in the technology disclosed in JP-A No. 2005-173703 described above, since a database expressing the risk in various traffic situations at crossroads and traffic merge points is required, there is the issue that all the situations that actually occur may not always be covered. Moreover, since the risk evaluation is based on a designer applying scoring, there is no physical significance thereto.

The present invention addresses the above issues, and an object thereof is to provide a moving object prediction device, a program and a moving object prediction method capable of predicting the future position of a moving object under various conditions with good precision.

Moreover, an object thereof is to provide a hypothetical movable object prediction device, a program and a hypothetical movable object prediction method capable of predicting the future position of a hypothetical movable object under various conditions with good precision.

Solution to Problem

In order to achieve the above object, a first aspect of the present invention is configured including: a moving object detection section that detects a position and a behavior state or a movement state of a moving object in a detection target range; a region detection section that detects plural categories of regions of track segment and regions of stationary object in the detection target range; a map generation section that generates a presence probability map in which a presence probability expressing a presence likelihood or presence unlikelihood of a moving object is applied to the track segment regions and the stationary object regions detected by the region detection section; a moving object recording section that generates a position distribution and a movement state distribution of the moving object based on the position and the behavior state or the movement state of the moving object detected by the moving object detection section, and records the distributions on the presence probability map; and a prediction section that moves the moving object position distribution based on the moving object movement state distribution, changes the moved position distribution based on presence probabilities of the presence probability map, and predicts a future position distribution of the moving object on the presence probability map.

Moreover, a second aspect of the present invention is a program that causes a computer to function as: a moving object detection section that detects a position and a behavior state or a movement state of a moving object in a detection target range; a region detection section that detects plural categories of regions of track segment and regions of stationary object in the detection target range; a map generation section that generates a presence probability map in which a presence probability expressing a presence likelihood or presence unlikelihood of a moving object is applied to the track segment regions and the stationary object regions detected by the region detection section; a moving object recording section that generates a position distribution and a movement state distribution of the moving object based on the position and the behavior state or the movement state of the moving object detected by the moving object detection section, and records the distributions on the presence probability map; and a prediction section that moves the moving object position distribution based on the moving object movement state distribution, changes the moved position distribution based on presence probabilities of the presence probability map, and predicts a future position distribution of the moving object on the presence probability map.

According to the first aspect and the second aspect of the present invention, the position and the behavior state or the movement state of a moving object in a detection target range are detected by the moving object detection section. Plural categories of the track segment regions and the stationary object regions are detected in the detection target range by the region detection section.

Then the presence probability map is generated by the map generation section in which the presence probability expressing a presence likelihood or presence unlikelihood of a moving object is applied to the track segment regions and the stationary object regions detected by the region detection section. The position distribution and the movement state distribution of the moving object are then generated by the moving object recording section based on the position and the behavior state or the movement state of the moving object detected by the moving object detection section, and recorded on the presence probability map.

The moving object position distribution is moved based on the moving object movement state distribution, and the moved position distribution is changed based on presence probabilities of the presence probability map and the future position distribution of the moving object is predicted on the presence probability map.

The future position of the moving object can be predicted under various conditions with good precision by moving the position distribution based on the moving object movement state distribution and changing the position distribution based on the presence probability map in which moving object presence probabilities are applied to the track section regions and the stationary object regions.

According to a third aspect of the present invention, the position distribution is represented by plural moving object particles, and the prediction section moves each of the plural moving object particles representing the moving object position distribution based on the moving object movement state distribution, changes the moving object position distribution by eliminating the moved moving object particles and replicating other moving object particles based on presence probabilities of the presence probability map, and predicts a future position distribution of the moving object on the presence probability map.

According to a fourth aspect of the present invention, the position distribution is represented by a probability distribution, and the prediction section moves the probability distribution representing the moving object position distribution based on the moving object movement state distribution, changes the moving object position distribution by weighting the moved probability distribution based on presence probabilities of the presence probability map, and predicts a future position distribution of the moving object on the presence probability map.

According to a fifth aspect of the present invention, the region detection section further detects categories of the track segment and a height of the stationary object, and the map generation section generates the presence probability map by applying the presence probability corresponding to the track segment category to the track segment region, and applying the presence probability corresponding to the stationary object height to the stationary object region. The future position of the moving object can accordingly be predicted with good precision.

According to a sixth aspect of the present invention, the moving object detection section detects a category of the moving object together with the position of the moving object in the detection target range and the behavior state or the movement state of the moving object, and the map generation section generates the presence probability map with the presence probability applied for each of the moving object categories. The future position of the moving object can accordingly be predicted with good precision.

According to a seventh aspect of present invention, the prediction section predicts the moving object future position distribution on the presence probability map by moving the moving object position distribution based on the moving object movement state distribution and changing the moved position distribution based on the magnitude of the presence probability applied to the region corresponding to the position distribution or based on the difference or ratio between the presence probability applied to the region corresponding to the position distribution and the presence probability applied to the region for the position distribution prior to moving.

According to an eighth aspect of the present invention, the moving object prediction device further includes a dangerousness computation section that computes a danger of collision between a computation subject moving object and a moving object other than the computation subject moving object based on a position distribution of the computation subject moving object and a position distribution of the moving object other than the computation subject moving object that have been predicted by the prediction section.

According to a ninth aspect of the present invention, the moving object recording section: identifies a blind-spot region formed by a stationary object as viewed from the moving object installed with the device itself based on the detected stationary object region and the position of the moving object installed with the device itself; generates a position distribution and a movement state distribution of a moving object postulated to be present in the identified blind-spot region; and records the generated moving object position distribution and movement state distribution in the identified blind-spot region on the presence probability map.

According to a tenth aspect of the present invention, the moving object recording section: identifies the blind-spot region based on the detected stationary object region and the position of the moving object installed with the device itself; estimates the category of a moving object postulated to be present in the identified blind-spot region based on the movement environment at the periphery of the identified blind-spot region, out of the movement environments detected by the movement environment detection section that detects movement environments of moving objects in the detection target range, or based on a position of the identified blind-spot region, and generates a position distribution and movement state distribution of the moving object in the blind-spot region; and records the generated position distribution and the movement state distribution of the moving object in the identified blind-spot region on the presence probability map.

According to an eleventh aspect of the present invention, the moving object prediction device further includes: an object position detection section that detects a position of an object present in the detection target range as viewed from a moving object installed with the device itself; a motion estimation section that estimates the motion of the moving object installed with the device itself; a map update section that repeatedly updates map data as currently viewed from the moving object installed with the device itself by updating the map data from the previous update time based on the current motion of the moving object installed with the device itself estimated by the motion estimation section; and a stationary object recording section that, each time the map data is updated by the map update section, records in the updated map data a stationary object presence in a block corresponding to a position of an object currently detected by the object position detection section, and reduces a record of stationary object presence in each block corresponding to between the moving object installed with the device itself and the current detected object position, wherein the region detection section detects the stationary object region based on the map data.

A twelfth aspect of the present invention includes: a step of detecting a position and a behavior state or a movement state of a moving object and detecting plural categories of regions of track segment and regions of stationary object in the detection target range; a step of generating a presence probability map in which a presence probability expressing a presence likelihood or presence unlikelihood of a moving object is applied to the detected track segment regions and the stationary object regions; a step of generating a position distribution and a movement state distribution of the moving object based on the position and the behavior state or the movement state of the detected moving object, and also moving the moving object position distribution based on the moving object movement state distribution, changing the moved position distribution based on presence probabilities of the presence probability map, and predicting a future position distribution of the moving object on the presence probability map.

A thirteenth aspect of the present invention is configured including: a region detection section that detects plural categories of regions of track segment and regions of stationary object in a detection target range; a map generation section that generates a presence probability map in which a presence probability expressing a presence likelihood or presence unlikelihood of a moving object is applied to the track segment regions and the stationary object regions detected by the region detection section; a blind-spot region identification section that identifies a blind-spot region in the detection target range where a movable object might be present; a hypothetical movable object generation section that generates a hypothetical movable object postulated to be present in the blind-spot region identified by the blind-spot region identification section; a hypothetical movable object recording section that, for the hypothetical movable object generated by the hypothetical movable object generation section, postulates a position and a behavior state or movement state of the hypothetical movable object, generates a position distribution and a movement state distribution of the hypothetical movable object, and records the distributions on the presence probability map; and a prediction section that moves the hypothetical movable object position distribution based on the hypothetical movable object movement state distribution, changes the moved position distribution based on presence probabilities of the presence probability map, and predicts a future position distribution of the hypothetical movable object on the presence probability map.

A fourteenth aspect of the present invention is a program that causes a computer to function as: a region detection section that detects plural categories of regions of track segment and regions of stationary object in a detection target range; a map generation section that generates a presence probability map in which a presence probability expressing a presence likelihood or presence unlikelihood of a moving object is applied to the track segment regions and the stationary object regions detected by the region detection section; a blind-spot region identification section that identifies a blind-spot region in the detection target range where a movable object might be present; a hypothetical movable object generation section that generates a hypothetical movable object postulated to be present in the blind-spot region identified by the blind-spot region identification section; a hypothetical movable object recording section that, for the hypothetical movable object generated by the hypothetical movable object generation section, postulates a position and a behavior state or movement state of the hypothetical movable object, generates a position distribution and a movement state distribution of the hypothetical movable object, and records the distributions on the presence probability map; and a prediction section that moves the hypothetical movable object position distribution based on the hypothetical movable object movement state distribution, changes the moved position distribution based on presence probabilities of the presence probability map, and predicts a future position distribution of the hypothetical movable object on the presence probability map.

According to the thirteenth and fourteenth aspect of the present invention, the plural categories of the regions of track segment and the regions of stationary object are detected by the region detection section in a detection target range. The presence probability map, in which the presence probability expressing a presence likelihood or presence unlikelihood of a moving object is applied to the track segment regions and the stationary object regions detected by the region detection section, is generated by the map generation section.

The blind-spot region in the detection target range where a movable object might be present is identified by the blind-spot region identification section. The hypothetical movable object postulated to be present in the blind-spot region identified by the blind-spot region identification section is generated by the hypothetical movable object generation section. For the hypothetical movable object generated by the hypothetical movable object generation section, the position and the behavior state or the movement state of the hypothetical movable object is postulated by the hypothetical movable object recording section, and the position distribution and the movement state distribution of the hypothetical movable object is generated and recorded on the presence probability map.

The hypothetical movable object position distribution is moved by the prediction section based on the hypothetical movable object movement state distribution, the moved position distribution is changed based on presence probabilities of the presence probability map, and the future position distribution of the hypothetical movable object is predicted on the presence probability map.

The future position of the hypothetical movable object can accordingly be predicted with good precision under various conditions by moving the position distribution based on the postulated movement state distribution for the hypothetical movable object postulated to be present in the blind-spot region, and changing the position distribution based on the presence probability map in which moving object presence probabilities are applied to the track section regions and the stationary object regions.

According to a fifteenth aspect of the present invention, the blind-spot region identification section together with identifying the blind-spot region also sets a presence probability of the blind-spot region in the presence probability map based on a distance of the blind-spot region.

According to a sixteenth aspect of the present invention, for the hypothetical movable object generated by the hypothetical movable object generation section, the hypothetical movable object recording section postulates a position of the hypothetical movable object and a behavior state or movement state of the hypothetical movable object, and also postulates the category of the hypothetical movable object based on a distance of the blind spot region in which the hypothetical movable object is present, generates a position distribution and a movement state distribution for the hypothetical movable object and records the distributions on the presence probability map.

According to a seventeenth aspect of the present invention, for the hypothetical movable object generated by the hypothetical movable object generation section, the hypothetical movable object recording section postulates a position of the hypothetical movable object and a behavior state or a movement state of the hypothetical movable object such that the hypothetical movable object will collide with the moving object installed with the device itself when the hypothetical movable object jumps out from the blind-spot region, and generates a position distribution and a movement state distribution for the hypothetical movable object and records the distributions on the presence probability map.

According to an eighteenth aspect of the present invention, for the hypothetical movable object generated by the hypothetical movable object generation section, the hypothetical movable object recording section: postulates as a position of the hypothetical movable object a position in the blind-spot region closest to the position of postulated collision with the moving object installed with the device itself when the hypothetical movable object jumps out from the blind-spot region, and postulates a behavior state or a movement state of the hypothetical movable object such that the hypothetical movable object will collide with the moving object installed with the device itself when the hypothetical movable object jumps out from the blind-spot region; and generates a position distribution and a movement state distribution for the hypothetical movable object and records the distributions on the presence probability map.

A nineteenth aspect of the present invention includes: a step of detecting plural categories of regions of track segment and regions of stationary object in a detection target range; a step of generating a presence probability map in which a presence probability expressing a presence likelihood or presence unlikelihood of a moving object is applied to the detected track segment regions and the detected stationary object regions; a step of identifying a blind-spot region in the detection target range where a movable object might be present; a step of generating a hypothetical movable object postulated to be present in the identified blind-spot region; a step of postulating for the generated hypothetical movable object a position and a behavior state or movement state of the hypothetical movable object, generating a position distribution and a movement state distribution of the hypothetical movable object, and recording the distributions on the presence probability map; and a step of moving the hypothetical movable object position distribution based on the hypothetical movable object movement state distribution, changing the moved position distribution based on presence probabilities of the presence probability map, and predicting a future position distribution of the hypothetical movable object on the presence probability map.

Advantageous Effects of Invention

As explained above, according to the moving object prediction device, the program and the moving object prediction method that are each an aspect of the present invention, the advantageous effect is obtained of being able to predict the future position of a moving object under various conditions with good precision by moving the position distribution based on the movement state distribution of the moving object, and changing the position distribution based on the presence probability map in which presence probabilities of a moving object are applied to the track section regions and the stationary object regions.

According to the hypothetical movable object prediction device, the program and the hypothetical movable object prediction method that are each an aspect of the present invention, the advantageous effect is obtained of being able to predict the future position of the hypothetical movable object under various conditions with good precision by moving the position distribution for a hypothetical movable object postulated to be present in a blind-spot region based on the postulated movement state distribution, and changing the position distribution based on the presence probability map in which presence probabilities of a moving object are applied to the track section regions and the stationary object regions.

BRIEF DESCRIPTION OF DRAWINGS

FIG. 2A is an image illustrating an example of a travelling environment.

FIG. 2B is an image illustrating local map data in an initial state.

FIG. 2C is an image illustrating local map data recorded with detection results of a LADAR.

FIG. 5 is a diagram illustrating an example of a table in which presence probabilities for a pedestrian are determined.

FIG. 6 is a diagram illustrating an example of a table in which presence probabilities for a vehicle itself are determined.

FIG. 8 is a diagram illustrating an example of a table in which a velocity covariance matrix according to average velocity is determined.

FIG. 12 is a block diagram illustrating a collision danger determination device according to a second exemplary embodiment of the present invention.

FIG. 16 is a flow chart illustrating contents of a danger determination processing routine in a collision danger determination device according to a third exemplary embodiment of the present invention.

FIG. 18 is a diagram illustrating an example of a database.

FIG. 19 is a diagram illustrating a table stored with peripheral data inputs and postulated outputs.

FIG. 23 is a diagram illustrating correspondence of blind-spot distances and presence probabilities.

FIG. 24 is a diagram illustrating correspondence of blind-spot distances and categories of hypothetical movable object.

BEST MODE FOR CARRYING OUT THE INVENTION

Detailed explanation follows regarding an exemplary embodiment of the present invention with reference to the drawings. Note that in the present exemplary embodiment explanation is given of a case in which the present invention is applied to a vehicle-installed collision danger determination device.

Figure 1:
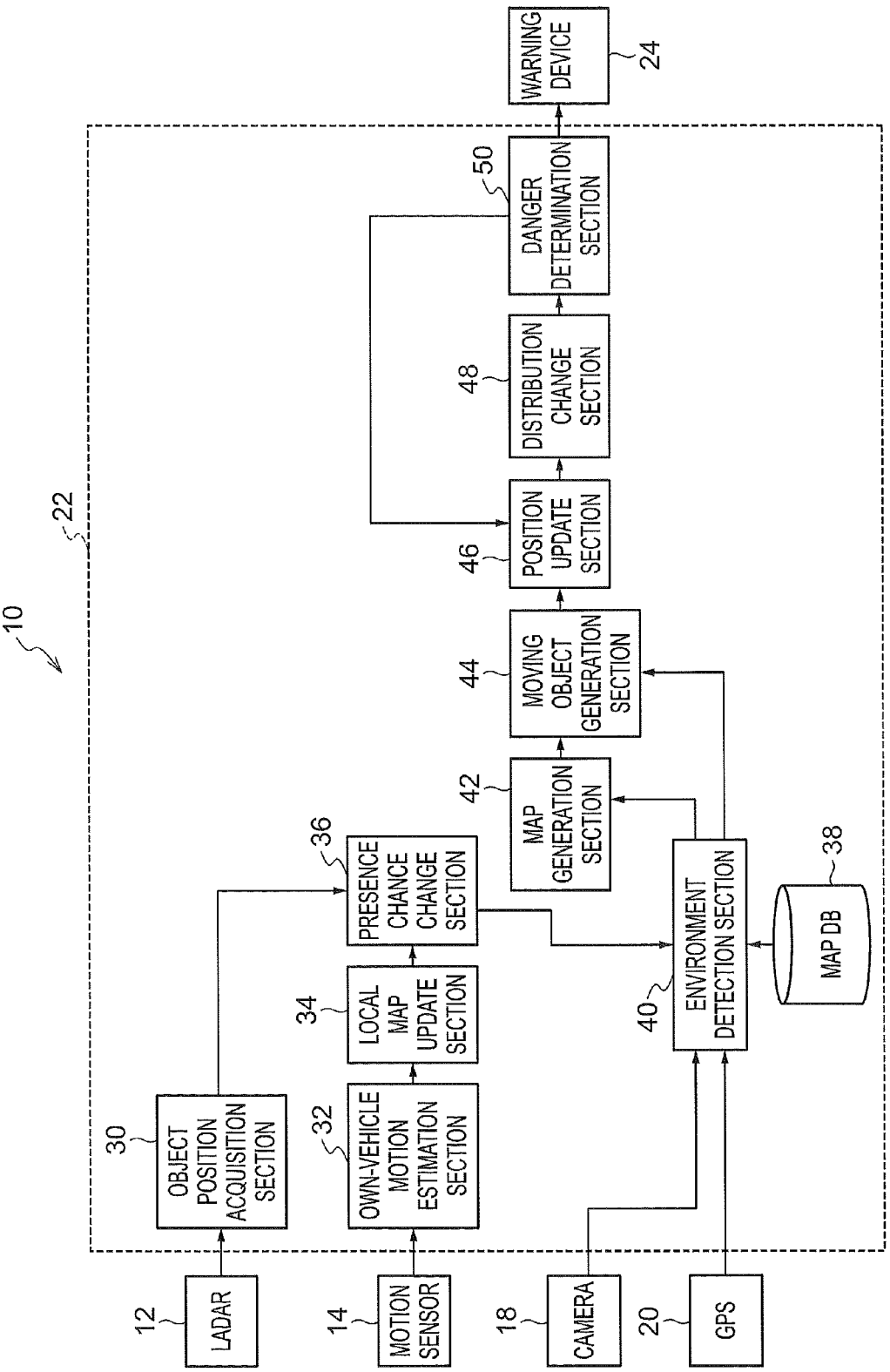
FIG. 1 is a block diagram illustrating a collision danger determination device according to a first exemplary embodiment of the present invention.

As illustrated in FIG. 1, a collision danger determination device 10 according to a first exemplary embodiment is equipped with: a LADAR 12 that illuminates a laser over a determination target range by scanning a laser in front of the vehicle itself in one-dimension (a horizontal direction), and detects a two-dimensional position of an object illuminated with the laser by laser reflection; a motion sensor 14 that detects a motion state of the vehicle itself; a camera 18 that captures images in front of the vehicle itself; a GPS device 20 that detects the position of the vehicle itself as a determination target object; and a computer 22 that based on these detection results generates local map data recorded with stationary object(s) currently present in front as viewed from the vehicle itself and determines a danger of collision with a moving object, and issues a warning using a warning device 24 when there is a danger of collision.

The LADAR 12 is a device installed at the front of a vehicle for detecting distance with respect to the device to an object present in front of the vehicle. The LADAR 12 is able to detect by laser reflection the position of plural points on plural object surfaces present in front of the vehicle itself by outputting and scanning a laser horizontally. The detection results from the LADAR 12 are assemblies of 2-dimensional coordinates expressing position points on an object surface present in front of the vehicle itself. Detection processing by the LADAR 12 is executed in a fixed cycle. The LADAR 12 outputs data expressing plural points of two-dimensional position on the surface of objects present in front of the vehicle itself at each time point. Note that the LADAR 12 is an example of an object position detection section.

The motion sensor 14 is configured by a vehicle velocity sensor that measures the velocity of the vehicle itself, a gyro sensor that measures a yaw rate and/or an acceleration sensor that measures the acceleration of the vehicle itself.

The camera 18 is configured by a compact CCD camera or a CMOS camera, and is attached for example to an upper portion of a vehicle front windshield so as to image in front of the vehicle. Image data captured by the camera 18 such of the road condition in front is input to the computer 22.

The computer 22 is configured including ROM stored with a program for causing a CPU to respectively execute a local map generation processing routine and a danger determination processing routine, described later, and RAM for storing data and the like, with these connected together by a bus. When explained in terms of functional blocks divided by each function execution means defined by hardware and software then, as illustrated FIG. 1, the computer 22 is equipped with: an object position acquisition section 30 that acquires two-dimensional positions of objects detected by the LADAR 12; an own-vehicle motion estimation section 32 that estimates own-vehicle motion based on velocity, yaw rate and/or acceleration detected by the motion sensor 14; a local map update section 34 that updates the local map data from one time previous, to a local map data in the current coordinate system as viewed from the vehicle itself based on the motion of the vehicle itself; and a presence chance change section 36 that changes the presence chance of a stationary object in the updated local map data based on the two-dimensional position of an object currently detected. Note that the presence chance change section 36 is an example of a stationary object recording section.

The own-vehicle motion estimation section 32 estimates the motion of the vehicle itself from when the local map data was updated the previous time to the current time based on the velocity, yaw rate and/or acceleration detected by the motion sensor 14 in the interval from when the local map data was previously updated to the current time.

The local map update section 34 converts the local map data that was updated the previous time to the current coordinate system as viewed from the vehicle itself based on the estimated motion of the vehicle, and generates local map data expressing the forward region as currently viewed from the vehicle itself. The local map update section 34 repeatedly performs updating of the local map data. The local map data is, as illustrated in FIG. 2B, a map of a determined region in front of the vehicle itself represented by plural blocks divided so as to give a lattice (blocks) of fixed size. The presence chance of a stationary object being present at a position in each of the blocks is recorded, and in the initial state, initial values of 0.5 (intermediate values) are recorded as initial values for presence chance, as illustrated in FIG. 2B.

Each time the local map data is updated by the local map update section 34, the presence chance change section 36 increases the presence chance of blocks corresponding to a two-dimensional position of an object in the updated local map data, based on respective two-dimensional positions of an object currently acquired by the object position acquisition section 30. The presence chance change section 36 also reduces the presence chance of each of the blocks present on a straight line from the vehicle itself to the two-dimensional position of the object. By changing the presence chance in this manner, the presence chance becomes high in blocks at positions corresponding to where an object is detected over a specific period of time and greater, and the presence chance becomes lower in blocks where an object is only detected temporarily. For a case with a travelling environment as illustrated in FIG. 2A, for example as illustrated in FIG. 2C, 1 (the maximum value) is recorded as the presence chance in blocks at positions where a stationary object is present with certainty, and 0 (the minimum value) is recorded as the presence chance in blocks at positions where a stationary object is not present. 0.5 (an intermediate value) is recorded as the initial value for the presence chance in blocks at positions where data cannot be obtained due to such reasons as being blocked by another object (blocks in blind-spot regions).

As a result, it is possible to stably detect only stationary objects such as roadside objects observable at positions for a comparatively long period of time, even in a travelling environment in which many moving objects are present. It is also possible to detect blocks with unchanged initial values (0.5) for the presence chance even in portions (non-visible regions) where it has not been possible up to now to obtain observations with the LADAR 12. Far regions where hardly any measurement points have been obtained by the LADAR 12 also do not change from the initial value and so these can be treated as being blind-spot regions.

The computer 22 is equipped with: a map database 38 stored with an electronic map; an environment detection section 40 that detects moving objects in the vicinity of the vehicle itself, the state of moving objects, and travelling environment conditions based on a forward image captured by the camera 18, generated local map data, the stored electronic map and the position of the vehicle itself detected by the GPS device 20; a map generation section 42 that generates a presence probability map in which the presence probability is expressed for each separate type of moving object based on the detected travelling environment conditions; a moving object generation section 44 that generates plural moving object particles as data expressing a moving object, applies a movement state to each of the moving object particles according to the moving state distribution of the moving object, and disposes the moving object particles on the presence probability map so as to represent the distribution of the positions of the detected moving objects; a position update section 46 that moves each of the moving object particles based on movement state; a distribution change section 48 that eliminates and replicates so as to change the disposition of the moving object particles based on the presence probability map; and a danger determination section 50 that determines a danger of collision between the vehicle and moving objects based on the disposition of the moving object particles of each of the moving objects and outputs the determination result to the warning device 24.

The processing of one cycle of the position update section 46, the distribution change section 48 and the danger determination section 50 is executed repeatedly. Note that the environment detection section 40 is an example of a moving object detection section, a region detection section, and a movement environment detection section. The position update section 46 and the distribution change section 48 are examples of a prediction section. The danger determination section 50 is an example of a dangerousness computation section.

Data relating to road profile and to road signs and structures is stored in the electronic map stored in the map database 38.

Based on the position of the vehicle itself detected by the GPS device 20, the environment detection section 40 detects, in the electronic map of the map database 38, data relating to regions of traveling segments (such as a vehicle lane, sidewalk, pedestrian crossing) and regions of track segment in the vicinity of the vehicle itself, road signs (such as signals and stop lines), and structures. Peripheral area types (such as school zone, shopping street, housing) and road attributes (such as the number of vehicle lanes, the width of vehicle lanes and the presence or absence of a central reservation) are also detected in the electronic map of the map database 38.

The environment detection section 40 detects in the local map data any regions in which stationary objects (such as guardrails, vegetation, buildings, parked vehicles) are present. The height of each of the stationary objects is also detected in forward images captured by the camera 18.

The environment detection section 40 identifies any blind-spot regions formed by stationary objects as viewed from the vehicle itself, based on the position of the vehicle itself and stationary object positions in the local map data.

The environment detection section 40 detects, in the forward images captured by the camera 18, the position and size of moving object present in front, the category of moving object (such as pedestrian, two-wheeled vehicle, vehicle), behavior state (such as orientation and gate), and movement states (such as velocity) using a training type of pattern recognition technology (for example SVM). The environment detection section 40 also detects a type (such as vehicle lane, sidewalk, pedestrian crossing, signal, stop line) and region for each type of the track segments in the road forward. Note that the environment detection section 40 discriminates between movable objects that are moving and movable objects that are stationary by time subtraction of continuous local map data, and identifies regions in which moving objects are present. The environment detection section 40 also associates regions in which identified moving objects are present with a category of the detected moving object.

Figure 3:
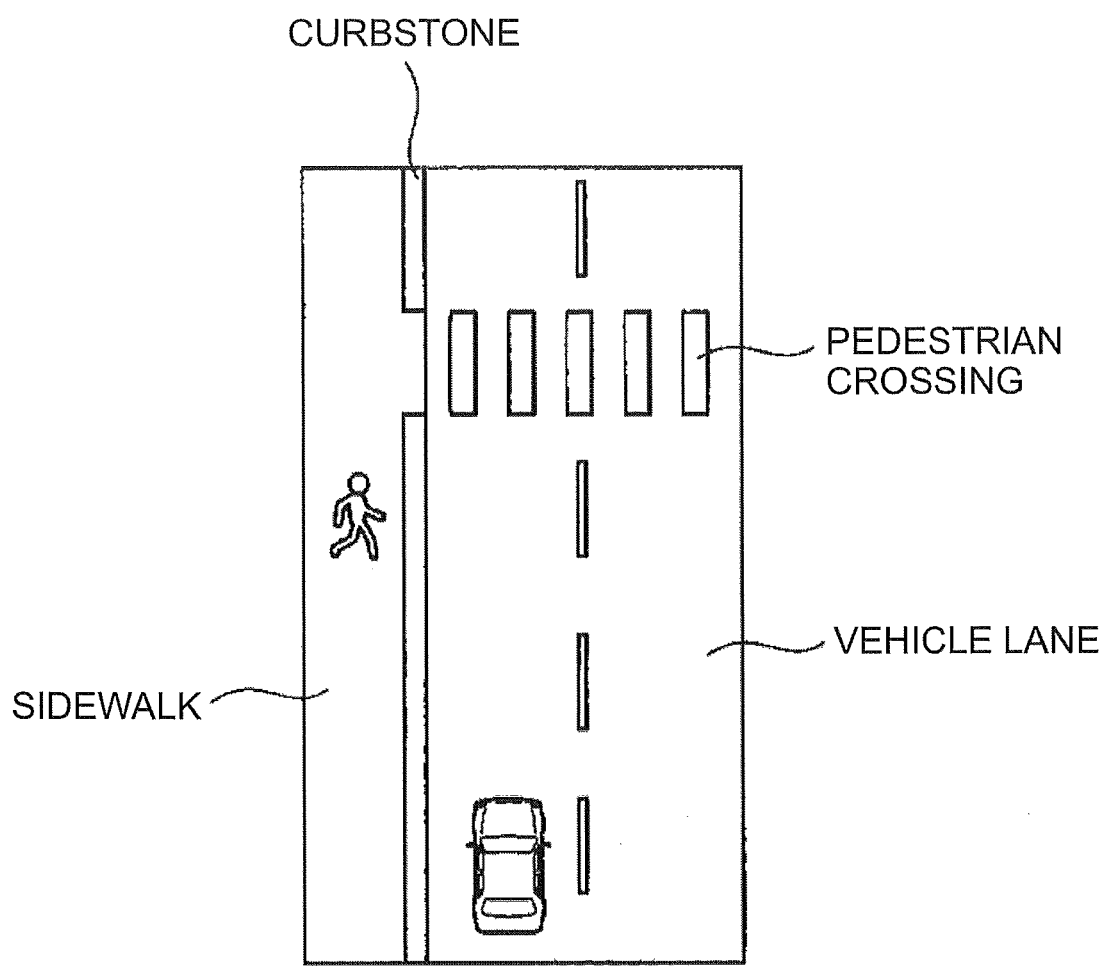
FIG. 3 is an image illustrating an example of a travelling environment.
Figure 4A:
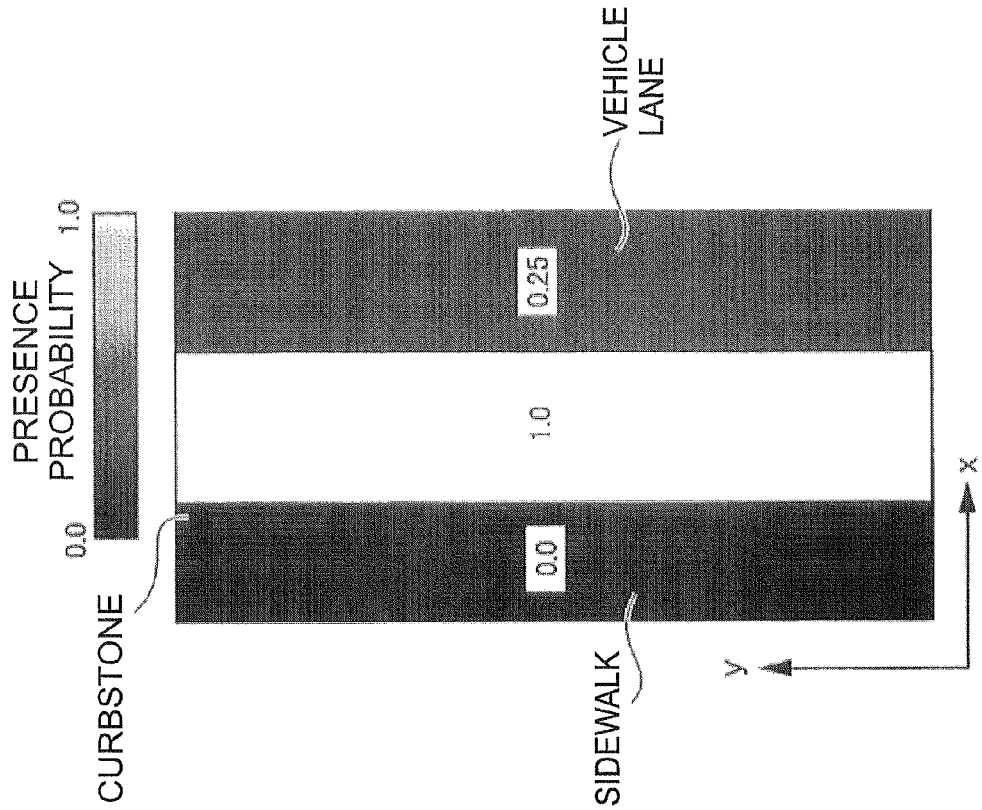
FIG. 4A is an image illustrating an example of a presence probability map expressing presence probabilities for a pedestrian.
Figure 4B:
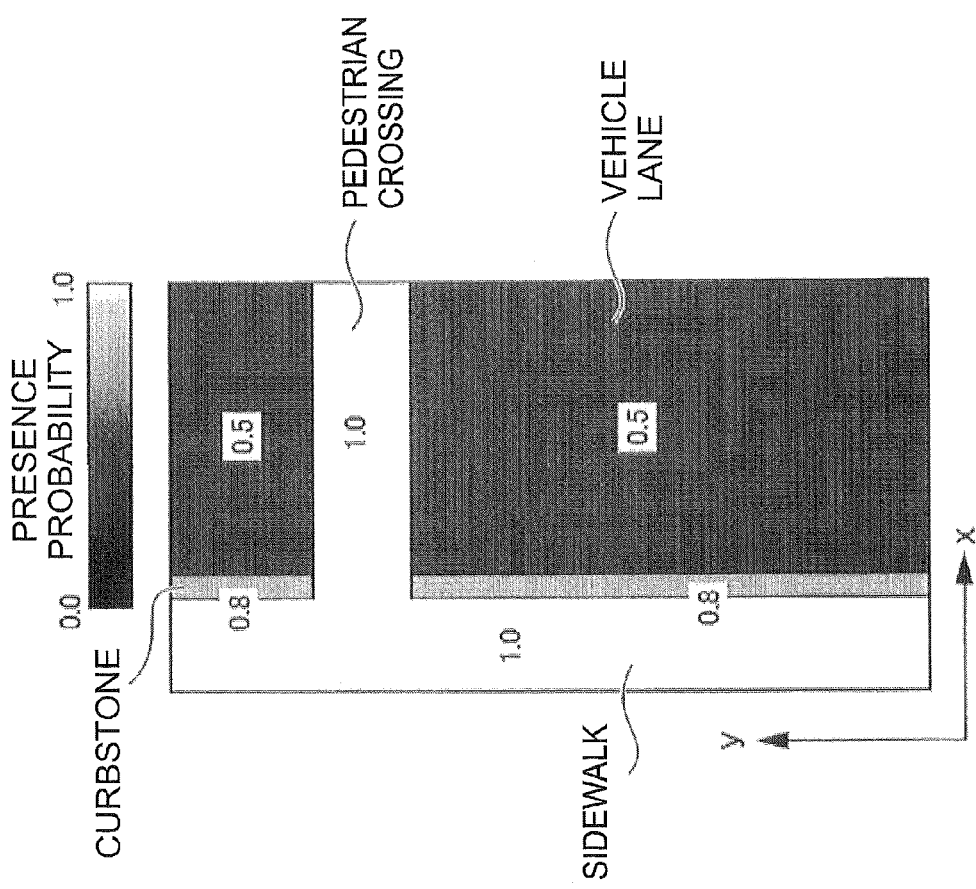
FIG. 4B is an image illustrating an example of a presence probability map expressing presence probabilities for a vehicle itself.

The map generation section 42 generates a presence probability map for each type of moving object based on such factors as the detected region of track segment, stationary object region and road attribute. For example, in the travelling environment as illustrated in FIG. 3 (a road with a single vehicle lane each way, with sidewalk and road segmented from each other by a curbstone of 0.2 m height), and in the situation in which there is a walking pedestrian present on the sidewalk, the map generation section 42 generates a presence probability map for the pedestrian like that illustrated in FIG. 4A. The map generation section 42 also generates a presence probability map for the vehicle itself like that illustrated in FIG. 4B.

In the presence probability map, a presence probability is applied to each type of traveling segment region and stationary object region. The presence probability is expressed from 0.0 to 1.0 for the likelihood of the presence of a pedestrian or vehicle in the target region. The presence probability of a traveling segment is, for example, determined according to a combination of the track segment and the road attribute, and stored in a pre-prepared table. For example, a table such as that illustrated in FIG. 5 is prepared with the presence probability with respect to a pedestrian, and a table such as that illustrated in FIG. 6 is prepared with the presence probability with respect to the vehicle itself.

Moreover, the presence probability of a stationary object region for a pedestrian is computed according to a height h (in) of the stationary object, for example by computation of presence probability according to the following Equation (1).

$$\text{Presence probability} = 1.0 - \min(h, 1.0) \quad (1)$$

wherein min (a, b) is a function representing the smallest out of a and b.

Moreover, 0.0 is, for example, applied as presence probability of a stationary object with respect to the vehicle itself.

Figures 7A, 7B, 7C:
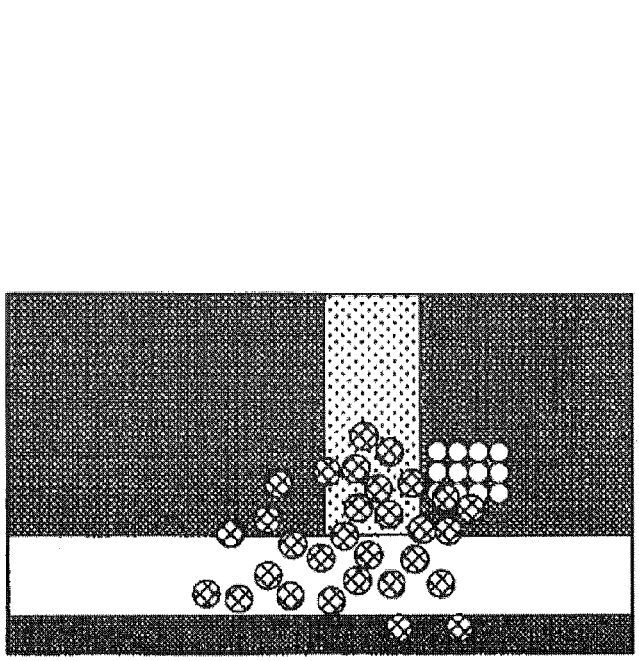
FIG. 7A is a diagram illustrating a manner of disposing moving object particles on a presence probability map.
FIG. 7B is a diagram illustrating disposed moving object particles that have been moved and changed.
FIG. 7C is a diagram illustrating disposed moving object particles that have been moved and changed.

The moving object generation section 44 takes any region in the presence probability map in which a moving object is identified as being present as a particle generation candidate region and also takes any blind-spot regions as particle generation candidate regions. The region in which the vehicle itself is present is also taken as a particle generation candidate region. Moreover, the moving object generation section 44 employs a random number generator to generate and dispose plural moving object particles for each of the particle generation candidate regions, as illustrated in FIG. 7A, so as to give a predetermined total number of particles.

The moving object generation section 44 sets as a distribution a movement state of a moving object based on a behavior state and a movement state of the detected moving object. The moving object generation section 44 sets as a physical amount employed as the movement state the orientation and one or other, or both, of velocity or acceleration.

For example, since it could be considered that the higher the velocity of the pedestrian, the stronger the linearity and the lower the uncertainty is in movement, the moving object generation section 44 therefore sets a distribution of movement states of the moving object employing a table of variance and covariance according to the average velocity of a pedestrian, as illustrated in FIG. 8. The distribution of movement states is set such that the velocity variance is large when the behavior state of the pedestrian is uncertain/meandering.

Moreover, the moving object generation section 44 generates an own-vehicle movement state distribution based on the vehicle velocity and orientation detected by the motion sensor 14.

The covariance matrix of movement state (velocity) is the 0 matrix with respect to the vehicle itself so as to give no uncertainty in movement. The covariance matrix of the movement state (velocity) with respect to a pedestrian indicates the uncertainty of movement of the pedestrian.

The movement state is respectively determined with respect to each of the moving object particles, based on the movement state distribution of the moving object set as described above.

A label of category of detection result of a moving object, such as a vehicle, a two-wheeled vehicle or a pedestrian, and data of the movement state determined based on the distribution of the set movement state are combined and allocated to the moving object particles disposed in the particle generation candidate region. Note that the total number of particles may be pre-set according to the processing power of the computer 22.

Identification data for discriminating between moving objects is also allocated to the moving object particles. For example moving object particles are generated allocated with the same identification data for a particle generation candidate region generated for each single moving object.

Figure 9:
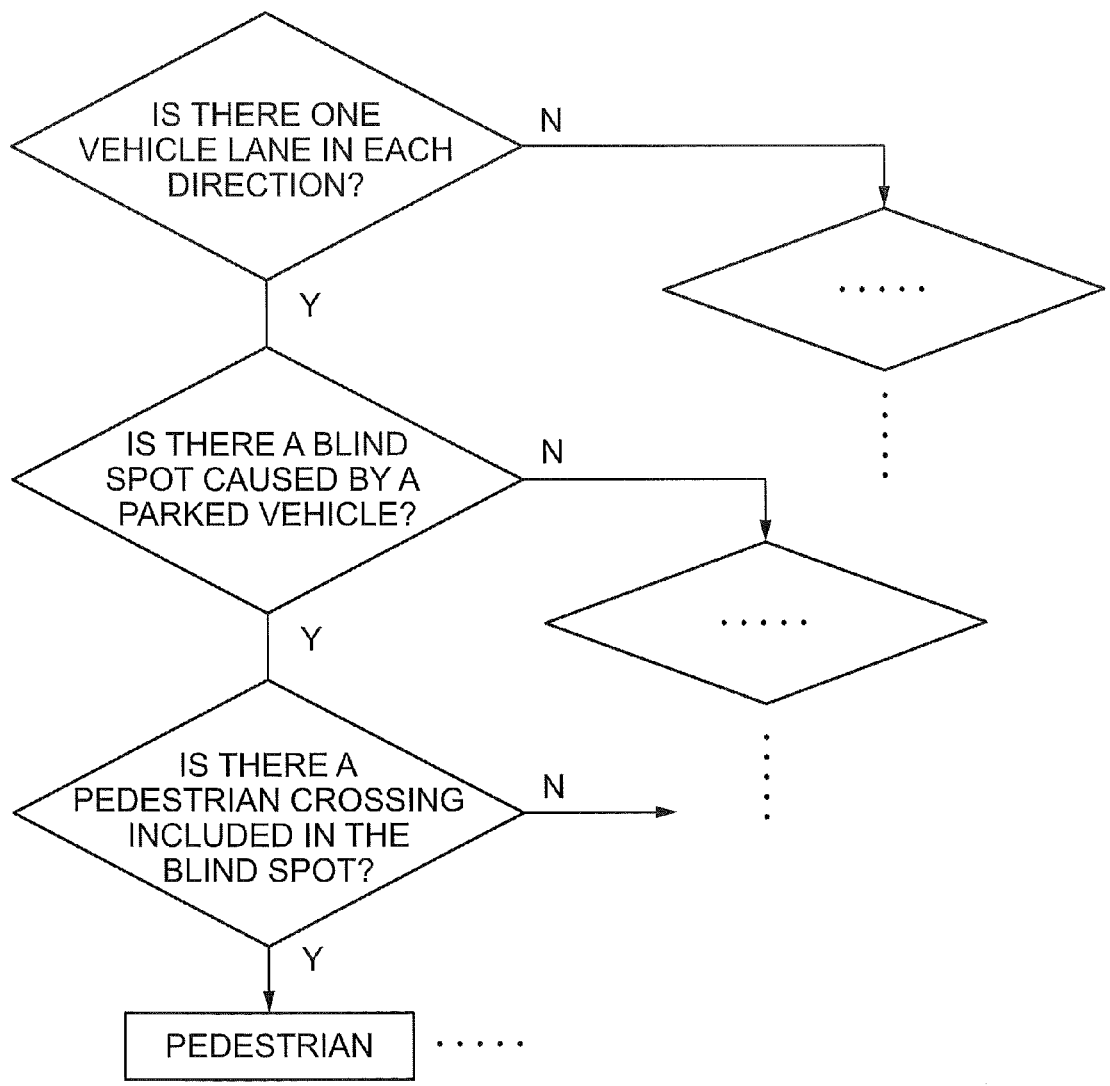
FIG. 9 is diagram illustrating an example of an IF-THEN rule.

A label indicating the category of moving object, such as vehicle, two-wheeled vehicle or pedestrian, based on the detection result of the environment detection section 40 and a predetermined IF-THEN rule as illustrated in FIG. 9, are allocated to moving object particles of a particle generation candidate region generated from a blind-spot region. Furthermore, data is allocated to the moving object particles that indicates the movement state determined based on predetermined movement state distributions of such factors as orientation, velocity and acceleration corresponding to each category of moving object. For example, moving object particles allocated with the label for a pedestrian are disposed when the road profile is a road with one vehicle lane in each direction, and the blind-spot region formed by a parked vehicle, and with a pedestrian crossing present in the blind-spot region.

The position update section 46 moves the position of each of the moving object particles based on the movement state applied to the moving object particles, and updates by one step the distribution of each of the moving object particles.

After each of the moving object particles have been moved, the distribution change section 48 eliminates/replicates moving object particles according the presence probability applied to the region at the movement position, performs reselection on the moving object particles so as to update the moving object position distribution (applies a limitation to moving object movement according to the likelihood of being present).

Configuration may be made such that a difference between or a ratio of presence probabilities applied to a region before and after movement is employed when the moving object particles are reselected, rather than the presence probability applied to the region at the movement position.

Explanation follows regarding the principles with which the distribution change section 48 performs reselection of each of the moving object particles.

First, each of the moving object particles is transitioned by update processing based on the movement state allocated to each of the moving object particles.

The lower the presence probability of the transition destination the higher the probability of the distribution change section 48 eliminating a given moving object particle. The distribution change section 48 then replicates and superimposes at the positions of other non-eliminated moving object particles, or at positions in the vicinity of other non-eliminated moving object particles (positions multiplied by a random number), for the same number of moving object particles to the number eliminated. Moving object particles are thereby newly created concentrated on regions of high presence probability. The elimination and replication described above is performed so that the total number of particles is constant.

For example, for a pedestrian walking with a stable gait and small velocity variance, by eliminating moving object particles centered on regions of low transition destination presence probability, and newly creating moving object particles centered on regions of high transition destination presence probability, the moving object particle disposition is changed to represent not crossing a pedestrian crossing, as illustrated in FIG. 7B. However, for a pedestrian with an uncertain/meandering gait and high velocity variance, by eliminating moving object particles centered on regions of low transition destination presence probability, and newly creating moving object particles centered on regions of transition destination presence probability, the moving object particle disposition is changed to represent crossing a pedestrian crossing, as illustrated in FIG. 7C.

The danger determination section 50 counts the number of superimpositions of own-vehicle moving object particles and moving object particles of other moving objects based on the dispositions of the moving object particles of each of the moving objects that have been changed by the distribution change section 48, and computes a collision probability with the other moving objects based on the counted number. The danger determination section 50 determines that there is a danger of collision when the computed collision probability exceeds a threshold value, and uses the warning device 24 to notify the driver of the category and position of the moving object of the corresponding superimposed moving object particles, by a method such as sound or picture. For example, when there is a danger of collision with a pedestrian at the front right of the vehicle itself, the driver is notified by speech of "Watch out! Pedestrian front right!". Note that a warning by the warning device 24 may be issued to the moving object of the corresponding superimposed moving object particles.

Note that in order to model collision avoidance behavior between moving objects other than the vehicle itself, configuration may be made such that the position distribution of moving objects involved in a collision (the disposition of the moving object particles) is changed when a collision (superimposition of moving object particles) is determined to occur between moving objects other than the vehicle, prior to computing the collision probability with the vehicle itself. Moreover, configuration may be made such that, in preparation for the next time of movement and collision determination, the position distribution (the disposition of the moving object particles) of the vehicle itself and the moving object involved in a collision is changed after computing the collision probability between the vehicle and the moving object.

Explanation follows regarding operation of the collision danger determination device 10 according to the present exemplary embodiment.

First, scanning is performed by the LADAR 12 in a horizontal direction in front of the vehicle itself, distances to respective two-dimensional positions of objects are calculated as laser reflection positions in a row along the scanning direction, and the two-dimensional positions of objects present in front of the vehicle itself are detected. The two-dimensional positions detected by the LADAR 12 are obtained for each scan of the laser.

Figure 10:
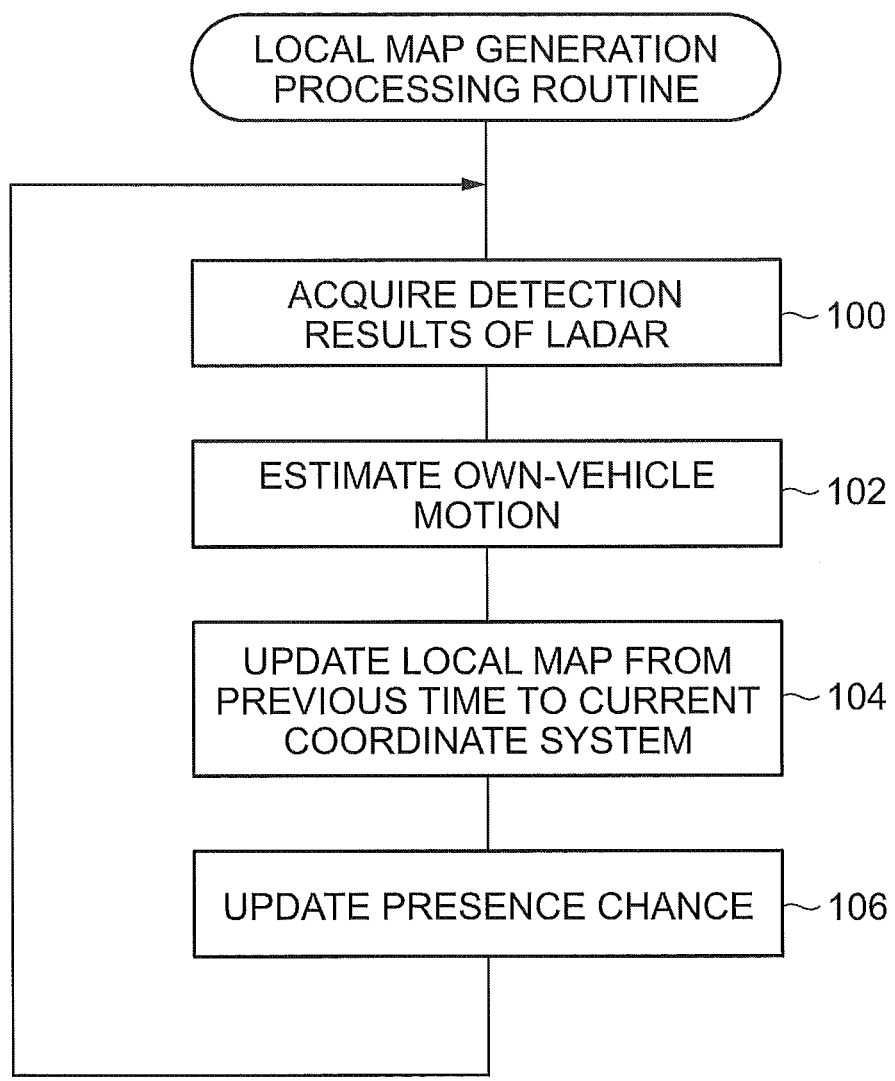
FIG. 10 is a flow chart illustrating contents of a local map data processing routine in a collision danger determination device according to the first exemplary embodiment of the present invention.

Then the local map generation processing routine illustrated in FIG. 10 is executed by the computer 22.

First, at step 100, the computer 22 acquires data from the LADAR 12 expressing the two-dimensional positions of objects present in front (the calculated distances to each of the two-dimensional positions in the row along the scanning direction). At step 102, the computer 22 acquires the velocity, yaw rate and/or acceleration detected by the motion sensor 14 in the interval from the previous time to the current time, and estimates the motion of the vehicle itself from the previous time to the current time based on the acquired velocity, yaw rate and/or acceleration.

Then, at step 104, the computer 22 updates the local map data updated the previous time in step 106, described later, according to the own-vehicle motion estimated at step 102, so as to update to local map data expressed in the current coordinate system as viewed from the vehicle itself.

At the next step 106, the computer 22 takes the local map data updated at step 104 and, based on the two-dimensional positions of objects present in front of the vehicle itself acquired at step 100, increases the presence probability of blocks corresponding to two-dimensional positions of objects present in front of the vehicle itself, and reduces the presence probability of each of the blocks present on a straight line from the vehicle itself to the two-dimensional position of the objects. The computer 22 thereby records positions where there are currently no objects present on the map. The computer 22 then returns to step 100.

The current position of stationary objects as viewed from the vehicle itself is continually estimated by repeatedly executing the local map generation processing routine as described above.

Note that configuration may be made such that the generated local map data is made valid when the above local map generation processing routine has been repeated a specific number of times.

Figure 11:
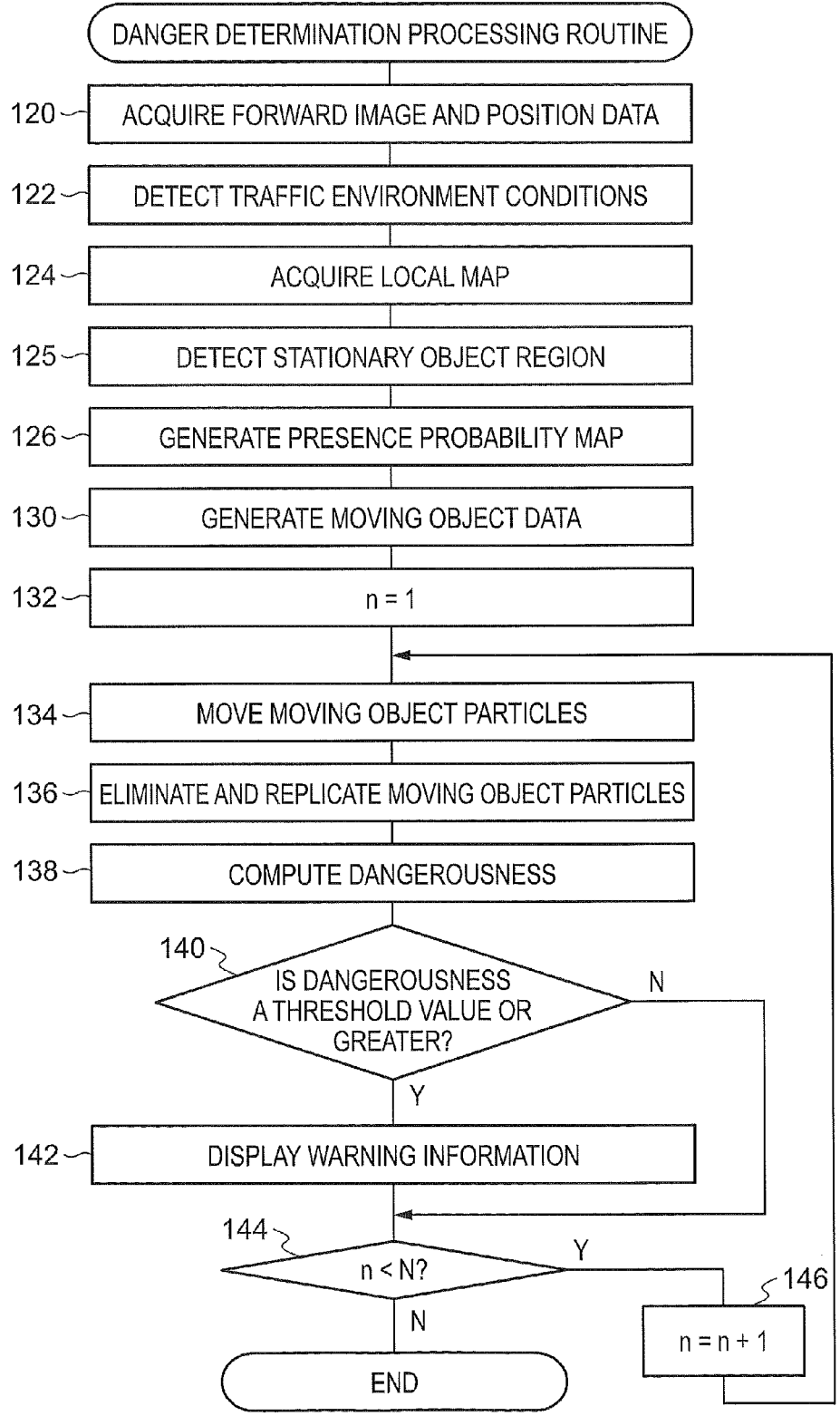
FIG. 11 is a flow chart illustrating contents of a danger determination processing routine in a collision danger determination device according to the first exemplary embodiment of the present invention.

The danger determination processing routine illustrated in FIG. 11 is also executed by the computer 22. First, at step 120, the computer 22 acquires the forward image captured by the camera 18 and the own-vehicle position detected by the GPS device 20. Then at step 122, based on the forward image and the own-vehicle position acquired at step 120 and the electronic map of the map database 38, the computer 22 detects conditions of the travelling environment, including the region of each of the track segments and the road attributes in the vicinity of the vehicle itself, and detects moving objects in the periphery, behavior states and movement states of the moving objects, categories of the moving object, and heights of stationary objects.

Then, at step 124, the computer 22 acquires the current local map data obtained by the local map generation processing routine described above. Then at step 125, the computer 22 detects regions in which stationary objects are present in the local map data acquired at step 124.

Then at step 126, the computer 22 generates a presence probability map based on the regions of track segment and road attributes detected at step 122, the regions where stationary objects are present detected at step 125, and a table in which presence probability is determined for each category of moving object according to the types of traveling segment, the road attributes and the stationary objects.

At step 130, the computer 22: sets moving object particle generation candidate regions in the presence probability map generated at step 126 for the moving objects and vehicle itself detected in step 122; generates moving object particles for each of the moving objects including the vehicle itself to give a pre-set total number of particles; and disposes these moving object particles in the corresponding moving object particle generation candidate regions. The computer 22 also derives a movement state distribution based on the detected behavior state and movement state for each of the moving objects, determines respective movement states for each of the moving object particles based on the derived movement state distribution, and allocates the movement states to each of the moving object particles.

Then at step 132, the computer 22 sets an initial value 1 for a variable n that counts the number of prediction steps.

Then, in step 134, the computer 22 moves each of the moving object particles according to the allocated movement state. At the next step 136, the computer 22 performs elimination and replication of moving object particles that were moved at step 134 according to presence probability in the presence probability map, so as to change the disposition of the moving object particles. At step 138, the computer 22 computes respective collision probabilities with other moving objects as a danger of collision, based on the superimposition frequency between the moving object particles of the other moving objects and the moving object particles of the vehicle itself that were changed at step 136.

Then, at step 140, the computer 22 determines whether or not there is a moving object present having a collision probability computed at step 138 of a threshold value or greater. When there is no qualifying moving object present, the computer 22 transitions to step 144. However, when there is a qualifying moving object present, at step 142 the computer 22 causes a future predicted position of this moving object and warning information to be displayed using the warning device 24, then transitions to step 144.

At step 144, the computer 22 determines whether or not the variable n indicating the prediction step has reached a step number N corresponding to the future prediction time. When the variable n has not yet reached the constant N, at step 146, the computer 22 increments the variable n, then returns to step 134, and repeats the processing of step 134 onwards. However, the computer 22 ends the danger determination processing routine when the variable n has reached the constant N.

As explained above, according to the collision danger determination device of the first exemplary embodiment, each of the moving object particles is moved based on a movement state distribution of the moving object, the disposition of each of the moving object particles is changed based on the presence probability map in which presence probabilities of moving objects have been applied to track segment regions and stationary object regions, and a position distribution is predicted for each of the moving objects. The collision danger determination device is accordingly capable of predicting future positions of moving objects with good precision under various conditions.

Future position prediction of moving objects is important in order to estimate a danger of collision with another object. A moving object is limited in movement by the traffic environment in which it is placed (such as by stationary obstructions and by track segments such as sidewalk, vehicle lanes and pedestrian crossings). A driver changes prediction of future positions according to moving object states (such as orientation and gait). There are thus multiple combinations of traffic environments and moving object states that need to be envisaged to realize a future position prediction of moving objects under various traffic conditions, making it difficult to prepare such combinations in advance. The collision danger determination device of the present exemplary embodiment thus independently sets a "moving object presence probability for a place" determined only by environment factors, and a "moving object movement uncertainty (movement state distribution)" determined only by the state of a moving object, then moves moving objects on a presence probability map based on the moving object movement state distribution. The collision danger determination device can accordingly perform moving object future position prediction that considers a combination of various traffic environments and moving object states. The collision danger determination device is able to estimate the danger of collision under various traffic conditions (arising from combinations of road environments and moving object states) by predicting the tendency for collision with the vehicle itself.

Moreover, using data of the travelling environment as a clue, danger determination can be performed considering the presence of moving objects present in blind-spot regions by generating moving object particles even in blind-spot regions from which normal sensor data cannot be obtained.

Moreover, it is possible to adjust the danger determination precision according to computer processing power by using a variable total number of particles.

Moreover, since the total number of particles is always constant, computation efficiency that is not affected by the complexity of the travelling environment conditions can be secured.

Explanation follows regarding a collision danger determination device according to a second exemplary embodiment. Note that portions of the configuration similar to those of the first exemplary embodiment are allocated the same reference numerals and further explanation thereof is omitted.

The second exemplary embodiment mainly differs from the first exemplary embodiment in the point that danger of collision is determined by predicting a future distribution of a moving object in a roadside device.

The collision danger determination device according to the second exemplary embodiment is installed fixed at the roadside, for example installed at a main crossroad intersection. As illustrated in FIG. 12, a collision danger determination device 210 is equipped with: a LADAR 12 that illuminates a laser over a determination target range in front of a vehicle by scanning a laser in one-dimension (a horizontal direction), and detects a two-dimensional position of objects illuminated with the laser by laser reflection; a camera 18 that captures images in front of the vehicle itself; a GPS device 20 that detects the position of the vehicle itself; and a computer 222 that based on these detection results generates local map data stored with stationary object(s) currently present in front as viewed from the vehicle itself, predicts a future position of moving objects, and transmits an instruction to display a warning message in a vehicle installed with a display device for displaying warning messages to a communication device 224 when determined according to the prediction result that there is a danger of collision.

The computer 222 is equipped with an object position acquisition section 30 and a presence chance change section 236 that changes a presence chance of a stationary object in local map data of a coordinate system as viewed from the device itself, based on two-dimensional positions of objects currently detected.

The computer 222 is also equipped with a map database 38, an environment detection section 40 that detects moving objects and travelling environment conditions in the vicinity of the vehicle itself; a map generation section 42; a moving object generation section 44; a position update section 46; a distribution change section 48; and a danger determination section 250 that determines for each moving object a danger of collision with another moving object based on a disposition of moving object particles of each moving object, and transmits an instruction to display the determination result in a vehicle installed with the display device using the communication device 224.

Then in a local map data processing routine according to the second exemplary embodiment, the computer 222 acquires data from the LADAR 12 expressing the two-dimensional positions of objects present in front. Then, based on the acquired two-dimensional positions of objects present in front of the vehicle itself, the computer 222 increases the presence chance of blocks in the local map data corresponding to two-dimensional positions of objects present in front of the device itself and decreases the presence chance of each of the blocks present on a straight line from the device itself to the two-dimensional positions of the objects. The computer 222 thus records positions where objects are currently not present on the map. The computer 222 then returns to the first processing.

As described above, continuous estimation is made of the current position of stationary objects as viewed from the device itself by repeatedly executing the local map generation processing routine.

In a danger determination processing routine according to the second exemplary embodiment, first the computer 222 acquires a forward image captured by the camera 18 and the position of the device itself detected by the GPS device 20. Then the computer 222 detects conditions of the travelling environment including the type of track segment regions and road attributes in the vicinity of the device itself, based on the forward image and the position of the device itself, acquired as described above, and an electronic map in the map database 38, and also detects the height of peripheral moving objects, behavior states and movement states of moving objects, categories of moving object and heights of stationary objects.

The computer 222 then acquires the current local map data obtained by the local map generation processing routine described above. The computer 222 then detects stationary object regions based on the acquired local map data, and generates a presence probability map in which presence probabilities have been applied to stationary object regions and track segment regions based on each of the types of track segment and road attributes detected as described above and based on the stationary object regions detected as described above.

The computer 222 then sets moving object particle generation candidate regions for moving objects detected as described above in the presence probability map generated as described above, generates moving object particles for each of the moving objects such that there is a pre-set total number of particles, and disposes the moving object particles in the corresponding moving object particle generation candidate regions. Moreover, the computer 222 derives a movement state distribution for each of the moving objects, and determines and allocates a movement state for each of the moving object particles based on the derived movement state distribution.

The computer 222 then sets an initial value 1 as the variable n that counts the number of prediction steps. The computer 222 moves each of the moving object particles according to the allocated movement states. The computer 222 then performs elimination and replication of the moving object particles moved as described above according to the presence probabilities in the presence probability map and changes the disposition of moving object particles. The computer 222 then, for each of the moving object determination subjects, computes, as dangers of collision, respective collision probabilities with other moving objects based on superimposition frequencies between the moving object particles of a moving object determination subject and the moving object particles of other moving objects that have been changed as described above.

The computer 222 then determines whether or not there is a moving object present with an above computed collision probability that is a threshold value or greater. When a qualifying moving object is present, the computer 222 uses the communication device 224 to transmit an instruction to display the future predicted position of a qualifying moving object and warning information on a display device installed in the determination subject moving object.

The computer 222 repeats the above processing until the variable n indicating the prediction step has reached the step number N corresponding to the future prediction time, and ends the danger determination processing routine when the variable n has reached the constant N.

As explained above, according to the collision danger determination device of the second exemplary embodiment, prediction of the future position of each of the moving objects in the periphery can be predicted by the roadside device with good precision under various conditions. The collision danger determination device can also estimate the danger of collision under various traffic conditions by predicting the tendency for collision between moving objects in the periphery.

Explanation next follows regarding a collision danger determination device according to a third exemplary embodiment. Note that configuration of the collision danger determination device according to the third exemplary embodiment that is similar to configuration of the first exemplary embodiment is allocated the same reference numerals and further explanation thereof is omitted.

The third exemplary embodiment mainly differs from the first exemplary embodiment in the point that the distribution of the position distribution and the movement state distribution of each of the moving objects exhibits normal distributions.

Figure 13A:
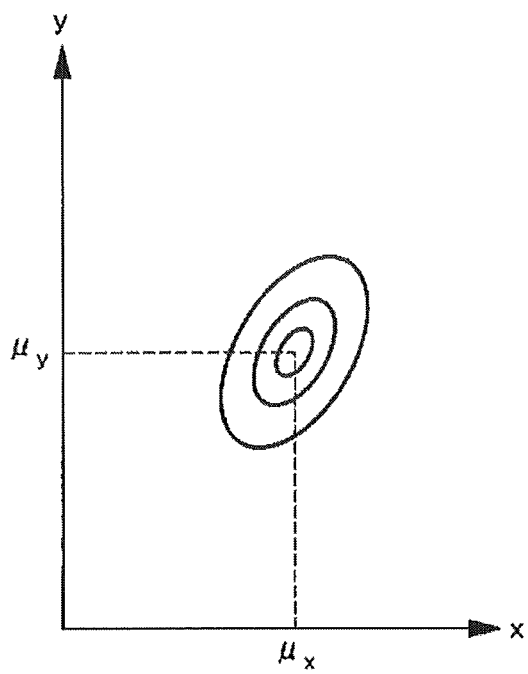
FIG. 13A is an image illustrating an example of a position distribution.

In the collision danger determination device according to the third exemplary embodiment, based on the position and size of a moving object detected by an environment detection section 40, the position of a moving object is, as illustrated in FIG. 13A, represented by a moving object generation section 44 as a two-dimensional normal distribution in own-vehicle centered x-y coordinate space (an average vector and variance matrix), so as to generate moving object data representing the position distributions of moving objects. The moving object generation section 44 records generated moving object data on a presence probability map. Note that the moving object generation section 44 employs observation values (detected positions of moving objects) as position average vectors and sets a position covariance matrix based on the size of the detected moving object.

Figure 13B:
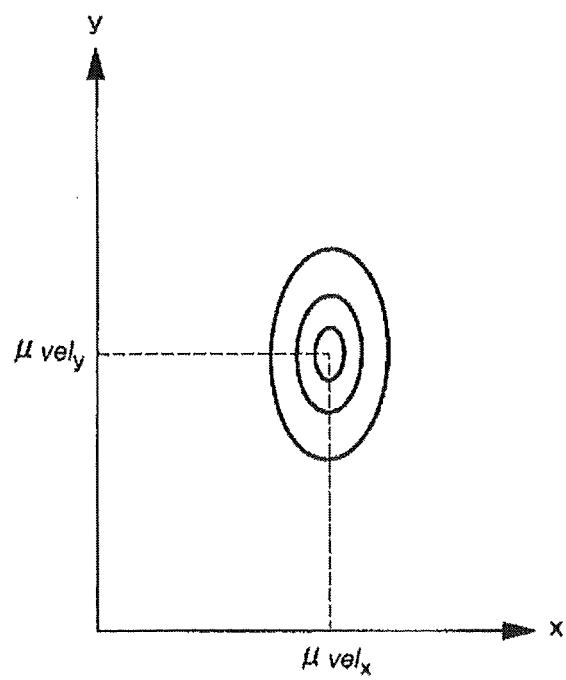
FIG. 13B is an image illustrating an example of a velocity distribution.

Moreover, based on the behavior state and movement state of the moving object detected by the environment detection section 40, the moving object generation section 44 also expresses the velocity of a moving object as a two-dimensional normal distribution (average vector and variance matrix) in own-vehicle centered x-y coordinate space, as illustrated in FIG. 13B, and allocates this to moving object data recorded on a presence probability map. Note that the moving object generation section 44 employs an estimate from a pedestrian detection result (behavior state and movement state) by the environment detection section 40 as an average vector for velocity. The moving object generation section 44 also employs a table of variance/covariance according to average velocity of pedestrians, such as illustrated in FIG. 8, to set the variance matrix of velocity.

The moving object generation section 44 also generates an own-vehicle velocity distribution based on vehicle velocity detected by a motion sensor 14, generates moving object data represented by a position distribution and velocity distribution of the vehicle itself, and records these data at the own-vehicle position on a presence probability map.

The position distribution of a moving object is expressed by the following Equation (2).

$$Pos(\mu_{pos}, \Sigma_{pos}) = \frac{1}{2\pi |\Sigma_{pos}|^{\frac{1}{2}}} \exp\left\{-\frac{1}{2}(x - \mu_{pos})^T \Sigma_{pos}^{-1}(x - \mu_{pos})\right\} \quad (2)$$

wherein $\mu_{pos}$ is a position average vector expressed by the following Equation (3), and $\Sigma_{pos}$ is a position covariance matrix expressed by the following Equation (4).

$$\mu_{pos} = \begin{bmatrix} \mu_x \\ \mu_y \end{bmatrix} \quad (3)$$

$$\Sigma_{pos} = \begin{bmatrix} \sigma_x^2 & \sigma_{xy} \\ \sigma_{xy} & \sigma_y^2 \end{bmatrix} \quad (4)$$

The velocity distribution is expressed by the following Equation (5).

$$Vel(\mu_{vel}, \Sigma_{vel}) = \frac{1}{2\pi |\Sigma_{vel}|^{\frac{1}{2}}} \exp\left\{-\frac{1}{2}(x - \mu_{vel})^T \Sigma_{vel}^{-1}(x - \mu_{vel})\right\} \quad (5)$$

wherein $\mu_{vel}$ is a velocity average vector expressed by the following Equation (6), and $\Sigma_{vel}$ is a velocity variance matrix expressed by the following Equation (7).

$$\mu_{vel} = \begin{bmatrix} \mu_{v_x} \\ \mu_{v_y} \end{bmatrix} \quad (6)$$

$$\Sigma_{vel} = \begin{bmatrix} \sigma_{v_x}^2 & \sigma_{v_x v_y} \\ \sigma_{v_x v_y} & \sigma_{v_y}^2 \end{bmatrix} \quad (7)$$

The moving object generation section 44 records moving object data in the presence probability map even in blind-spot regions identified by the environment detection section 40.

A label representing a category of moving object, such as a vehicle, two-wheeled vehicle or pedestrian is allocated to the moving object data recorded in the blind-spot regions based on the detection results of the environment detection section 40 and a predetermined IF-THEN rule such as that illustrated in FIG. 9. Moreover, a predetermined position distribution and velocity distribution is allocated to the moving object data according to the category of moving object.

Figure 14:
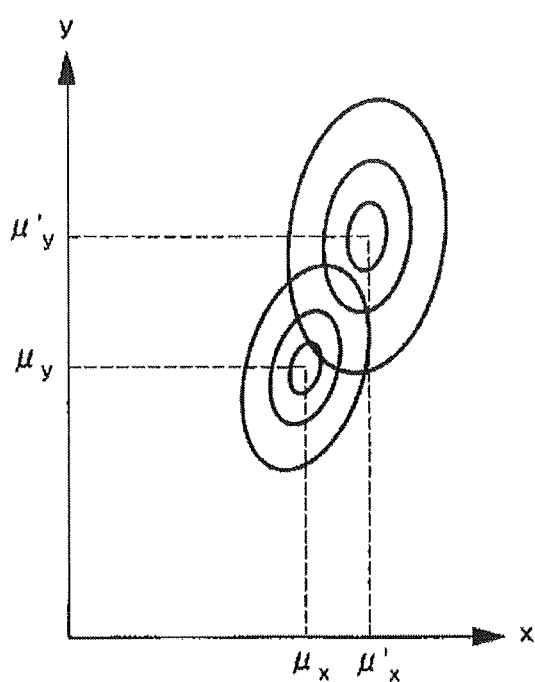
FIG. 14 is an image illustrating a manner in which a position distribution is moved.

A position update section 46 derives a position distribution of a moving object after $\Delta t$ seconds by linear prediction employing the position distribution and the velocity distribution of the moving object, as illustrated in FIG. 14.

A position average vector $\mu_{pos}{'}$ and a position covariance matrix $\Sigma_{pos}{'}$ of the position distribution after updating are expressed by the following Equation (8) and Equation (9), respectively.

$$\mu'_{pos} = \mu_{pos} + \Delta t \cdot \mu_{vel} = \begin{bmatrix} \mu_x + \Delta t \cdot \mu_{v_x} \\ \mu_y + \Delta t \cdot \mu_{v_y} \end{bmatrix} \quad (8)$$

$$\Sigma'_{pos} = \Sigma_{pos} + \Delta t^2 \cdot \Sigma_{vel} = \begin{bmatrix} \sigma_x^2 + \Delta t^2 \cdot \sigma_{v_x}^2 & \sigma_{xy} + \Delta t^2 \cdot \sigma_{v_x v_y} \\ \sigma_{xy}^2 + \Delta t^2 \cdot \sigma_{v_x v_y} & \sigma_y^2 + \Delta t^2 \cdot \sigma_{v_y}^2 \end{bmatrix} \quad (9)$$

Figure 15:
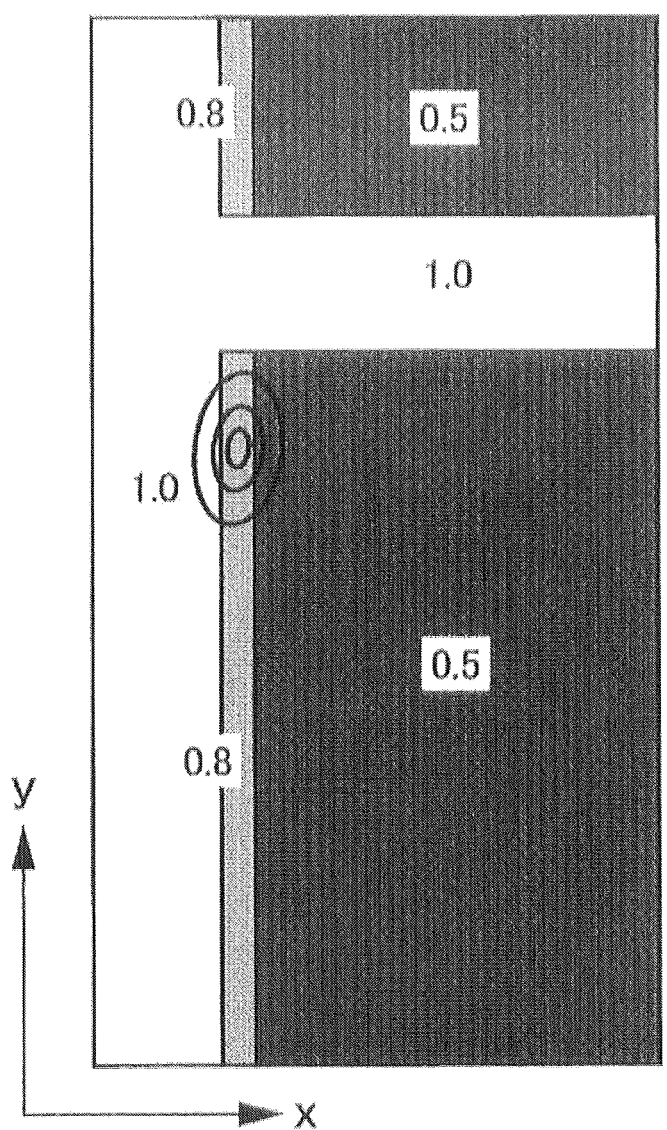
FIG. 15 is an explanatory diagram of weighting application to a position distribution after moving.

In order to compute the collision probability in a danger determination section 50 at a later stage, a distribution change section 48 performs weighting by the presence probability that has been applied to the corresponding region, as illustrated in FIG. 15, to the probability density of each of the points (positions) in the position distribution after movement. Note that in order to apply weighting by presence probability, configuration may be made such that weighting application is performed employing a difference or ratio of presence probabilities allocated to the region before and after movement instead of the presence probability applied to the region at the movement position.

For example, the position distribution of a pedestrian after movement is expressed by the following Equation (10), wherein the presence probability of a pedestrian at the position x is $\text{Exist}_{ped}(x)$.

$$Ped(x) = \frac{1}{2\pi |\Sigma_{pos}|^{\frac{1}{2}}} \exp\left\{-\frac{1}{2}(x - \mu_{pos})^t \Sigma_{pos}^{-1}(x - \mu_{pos})\right\} \quad (10)$$

When this is performed, a position distribution Ped' (x) weighted by the presence probability is expressed by the following Equation (11).

$$Ped'(x) = \text{Exist}_{ped}(x) \cdot Ped(x) \quad (11)$$

$$= \text{Exist}_{ped}(x) \cdot \frac{1}{2\pi |\Sigma_{pos}|^{\frac{1}{2}}} \exp\left\{-\frac{1}{2}(x - \mu_{pos})^t \Sigma_{pos}^{-1}(x - \mu_{pos})\right\}$$

Since the value of the integral of the position distribution across the whole of the target region is sometimes not 1 when using Equation (11) unmodified, normalization is performed to achieve an integral of 1, as expressed by the following Equation (12).

$$Ped''(x) = \frac{Ped'(x)}{\int_D \int Ped'(x)dx} \quad (12)$$

$$= K_{ped} \cdot Ped'(x)$$

$$= K_{ped} \cdot \text{Exist}_{ped}(x) \cdot Ped(x)$$

$$\text{wherein, } K_{ped} = \frac{1}{\int_D \int Ped'(x)dx} = \text{a constant}$$

The position distribution after change derived as described above is only employed at the collision determination time, and the position distribution prior to change is employed when the moving object is moved the next time.

The danger determination section 50 employs the position distribution of the vehicle itself and the position distribution of other moving objects to compute a collision probability as a danger level. The collision probability is a probability of being present at the same position at the same future time (simultaneous probability), and is derived in the following manner.

The simultaneous probability (collision probability) can be derived as values, which are the multiple of the position distributions of the vehicle itself and the other moving objects, integrated over a collision range (this integral is normally derived by numerical integration). In the present exemplary embodiment, the entire presence probability map is employed as the integration range.

As a result of moving and changing the position distribution of the moving object, the position distribution of the vehicle itself is, similarly to Equation (12), expressed by the following Equation (13), with a normalized position distribution weighted by presence probability.

$$Ego''(x) = \frac{Ego'(x)}{\int_D \int Ego'(x)dx} \quad (13)$$

$$= K_{ego} \cdot Ego'(x)$$

$$= K_{ego} \cdot \text{Exist}_{ego}(x) \cdot Ego(x)$$

wherein Ego (x) is the position distribution of the vehicle itself expressed similarly to Equation (2). The $\text{Exist}_{ego}$ (x) is a presence probability of the vehicle itself at position x.

The position distribution of other moving objects is expressed by Equation (12), and the derived combined integral is the sum of the integrals of all combinations of the position distribution of the vehicle and of the other moving objects, derived according to the following Equation (14).

$$Prob_{col} = \int_D \int Ped''(x) \cdot Ego''(x) dx \quad (14)$$

$$= \int_D \int \{K_{ped} \cdot Exist_{ped}(x) \cdot Ped(x)\} \cdot \{K_{ego} \cdot Exist_{ego}(x) \cdot Ego(x)\} dx$$

$$= K_{ped} \cdot K_{ego} \int_D \int Exist_{ped}(x) \cdot Exist_{ego}(x) \cdot Ped(x) \cdot Ego(x) dx$$

wherein D is the integration range (two-dimensional region) and is the entire region of the presence probability map.

The danger determination section 50 determines whether or not the computed collision probability is the threshold value or greater. When there is a moving object present with a collision probability of the threshold value or greater, the danger determination section 50 displays the future predicted position of the qualifying moving object and warning information on a warning device 24, so as to alert the driver to be careful.

The processing cycle by the position update section 46, the distribution change section 48 and the danger determination section 50 is executed repeatedly for a pre-set prediction times worth, and at each of the prediction steps, the position distribution is moved for each of the moving objects, and the position distribution is changed according to the presence probabilities. Moreover, in each of the prediction steps, the collision probabilities between the vehicle itself and each of the moving objects is computed, and when there is a collision probability of the threshold value or greater, data such as the future predicted position of a qualifying moving object and warning information is displayed in this prediction step by the warning device 24.

Explanation follows regarding operation of the collision danger determination device according to the third exemplary embodiment.

First, scanning is performed by the LADAR 12 in a horizontal direction in front of the vehicle itself, two-dimensional positions of objects present in front of the vehicle itself are detected, and then the local map generation processing routine illustrated in FIG. 10 is executed by a computer 22. Continuous estimation of the current position of stationary objects as viewed from the vehicle itself is thereby performed by repeatedly executing the local map generation processing routine.

Moreover, the danger determination processing routine illustrated in FIG. 16 is executed by the computer 22. Note that processing similar to that of the first exemplary embodiment is allocated the same reference numerals and further explanation thereof is omitted.

First, at step 120, the computer 22 acquires the forward image captured by a camera 18 and the own-vehicle position detected by a GPS device 20. At the next step 122 the computer 22 detects travelling environment conditions in the vicinity of the vehicle itself including each track section region type and road attribute, and detects peripheral moving objects, behavior states and movement states of moving objects, categories of moving object and the height of stationary objects.

Then, at step 124, the current local map data is acquired by the computer 22. At the next step 125, regions in which stationary objects are present are detected by the computer 22. Then, at step 126, the computer 22 generates a presence probability map.

At step 300, the computer 22 generates moving object data representing the position distribution and velocity distribution of moving objects including the vehicle itself based on a behavior state and movement state detected at step 122 and on detection results of the motion sensor 14, and records this data in a presence probability map.

At the next step 132, the computer 22 sets an initial value 1 for a variable n that counts the number of prediction steps.

Then at step 302, the computer 22 predicts a position distribution of moving objects at the prediction step n for each of the moving objects including the vehicle itself based on the position distribution and velocity distribution obtained at step 300 and step 302, and moves the position distribution of each of the moving objects.

At the next step 304, the computer 22 changes the position distribution of each of the moving objects that were moved at step 302 according to presence probabilities of the presence probability map. At step 306, the computer 22 computes respective collision probabilities with other moving objects as dangers of collision based on the position distribution of the other moving objects and the position distribution of the vehicle itself that have been changed at step 304.

Then at step 140, the computer 22 determines whether or not there is a moving object present with a collision probability computed at step 306 of a threshold value or greater. The computer 22 transitions to step 144 when there is no qualifying moving object present. However, when a qualifying moving object is present, at step 142 the computer 22 displays the future predicted position of the qualifying moving object and warning information on the warning device 24, and then transitions to step 144.

At step 144, the computer 22 determines whether or not the variable n representing the prediction step has reached the step number N corresponding to the future prediction time. The computer 22 increments the variable n at step 146 when the variable n has not yet reached the constant N, and returns to step 302 and repeats the processing of step 302 onwards. However the computer 22 ends the danger determination processing routine when the variable n has reached the constant N.

As explained above, according to the collision danger determination device of the third exemplary embodiment, the position distribution of a moving object is moved based on the movement state distribution of the moving object, the position distribution of a moving object is changed based on a presence probability map in which presence probabilities for moving objects are allocated to track segment regions and stationary object regions, and a position distribution of the moving object is predicted. The collision danger determination device can thereby predict with good precision the future position of a moving object under various conditions. Moreover, the collision danger determination device is able to estimate the danger of collision under various traffic conditions (arising from combinations of road environments and moving object states) by predicting the tendency to collide with the vehicle.

Explanation next follows regarding a collision danger determination device of a fourth exemplary embodiment. Note that the configuration of the collision danger determination device according to the fourth exemplary embodiment is similar to that of the second exemplary embodiment, and so the same reference numerals are allocated thereto and further explanation thereof is omitted.

The fourth exemplary embodiment mainly differs from the third exemplary embodiment in the point that the future distributions of moving objects are predicted and danger of collision is determined in a roadside device.

A collision danger determination device 210 according to the fourth exemplary embodiment is installed fixed at the roadside, installed for example at a main crossroad intersection.

A moving object generation section 46, a position update section 46 and a distribution change section 48 of a computer 222 are similar to those of the third exemplary embodiment described above. A danger determination section 250 determines a danger of collision with another moving object for each of the moving objects based on position distributions for each of the moving objects, and employs a communication device 224 to transmit an instruction to display the detection result on a vehicle installed with a display device.

A local map data processing routine according to the fourth exemplary embodiment is similar to the local map data processing routine according to second exemplary embodiment described above, and so further explanation thereof is omitted.

In a danger determination processing routine according to the fourth exemplary embodiment, the computer 222 first acquires a forward image captured by a camera 18 and the position of the device itself detected by a GPS device 20. Then the computer 222 detects conditions of the travelling environment including the type of track segment regions and road attributes in the vicinity of the device itself, based on the forward image and the position of the device itself acquired as described above, and an electronic map in the map database 38, and also detects the height of peripheral moving objects, behavior states of moving objects, categories of moving object and heights of stationary objects.

The computer 222 then acquires the current local map data obtained by the local map generation processing routine described above. The computer 222 then detects stationary object regions based on the acquired local map data. The computer 222 generates a presence probability map in which presence probabilities have been applied to stationary object regions and track segment regions based on each of the types of track segment and road attribute detected as described above, and on the stationary object regions detected as described above.

The computer 222 then generates moving object data representing the position distribution and velocity distribution for each of the moving objects detected as described above, and records this data on the presence probability map generated as described above.

The computer 222 then sets an initial value 1 as the variable n that counts the number of prediction steps. Then the computer 222 moves the position distribution of each of the moving objects according to the allocated velocity distributions. The computer 222 then changes the position distribution of the moving objects that have been moved as described above, so as to weight according to the presence probability of the presence probability map. Then, with each of the moving objects as a determination subject, the computer 222 computes respective collision probabilities with other moving objects as dangers of collision based on the position distributions of the determination subject moving object and the position distribution of other moving objects that have been changed as described above.

The computer 222 then determines whether or not there is a moving object present with an above computed collision probability that is a threshold value or greater. When a qualifying moving object is present, the computer 222 uses the communication device 224 to transmit to the determination subject moving object an instruction to display the future predicted position of a qualifying moving object and warning information on a display device installed in the determination subject moving object.

The computer 222 repeats the above processing until the variable n indicating the prediction step has reached the step number N corresponding to the future prediction time, and ends the danger determination processing routine when the variable n has reached the constant N.

As explained above, according to the collision danger determination device of the fourth exemplary embodiment, the future position of the moving objects can be predicted with good precision under various conditions in the roadside device. The collision danger determination device can also estimate the danger of collision under various traffic conditions by predicting the tendency of collisions between moving objects in the periphery.

Explanation follows regarding a collision danger determination device according to a fifth exemplary embodiment. Note that since the configuration of the collision danger determination device according to the fifth exemplary embodiment is similar to the configuration of the first exemplary embodiment, the same reference numerals are allocated and further explanation thereof is omitted.

The fifth exemplary embodiment differs from the first exemplary embodiment in the point that the category of moving object of moving object particles disposed in a blind-spot region is estimated based on the position of the blind-spot region.

In a moving object generation section 44 of a collision danger determination device according to the fifth exemplary embodiment, a label of a category of moving object, such as a vehicle, two-wheeled vehicle or pedestrian, is allocated in the following manner to moving object particles of a particle generation candidate region generated from a blind-spot region based on the position of the blind-spot region.

Figure 17:
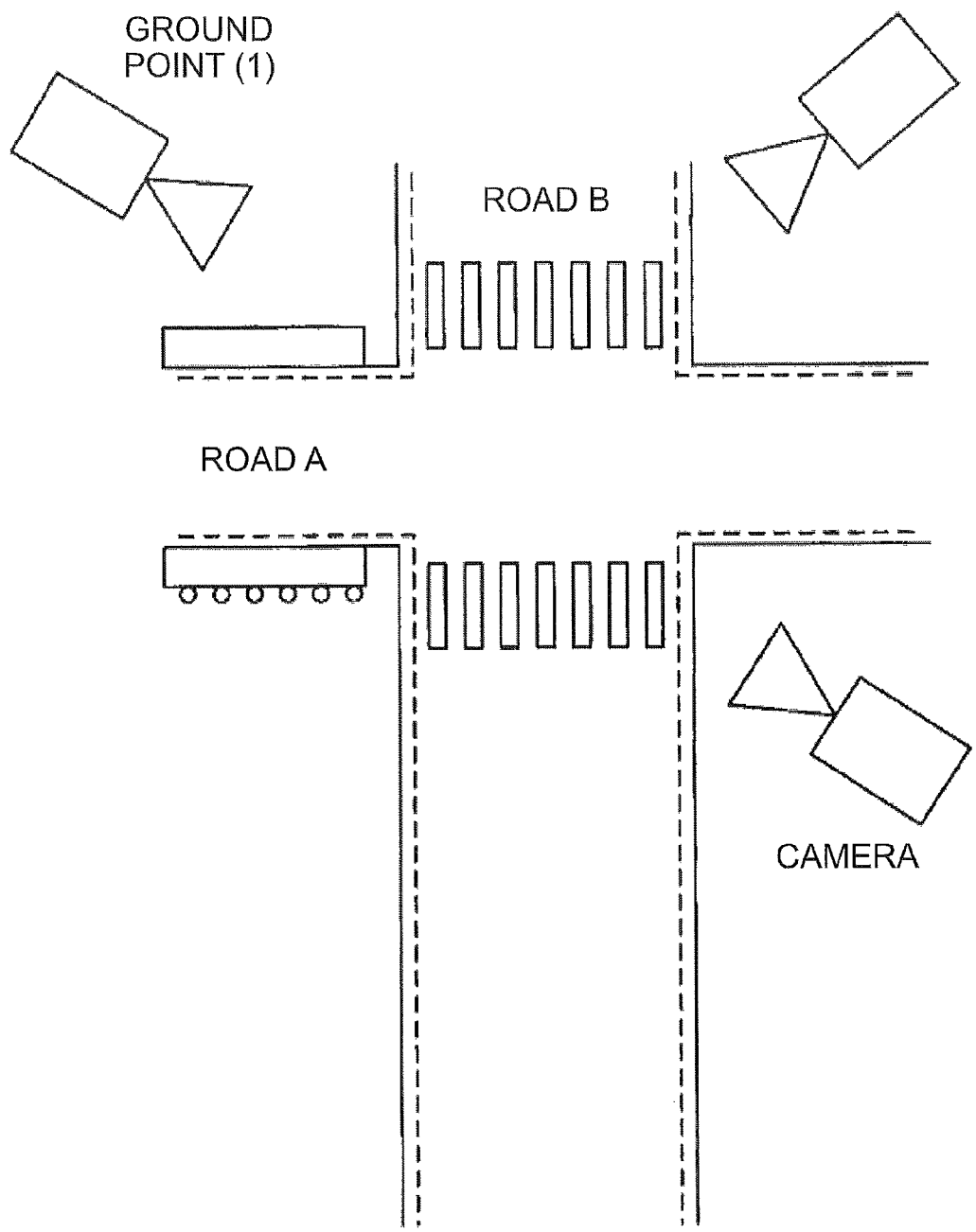
FIG. 17 is a diagram illustrating a manner in which fixed point observation is performed.

For example, an appearance frequency of moving objects at a place is recorded and accumulated in advance by fixed point observation. At locations such as accident prone crossroad intersections, as illustrated in FIG. 17, categories of moving object that pass following along roads/sidewalks or make a crossing are recorded as separated layers such as by season or time band using a method such as camera imaging, and, as illustrated in FIG. 18, a database stored with movement direction, types of moving object and frequencies is generated and stored for each location.

The moving object generation section 44 identifies categories of moving object with high appearance frequencies based on the database generated for a blind-spot region location, and allocates a label indicating the identified category of moving object for moving object particles of particle generation candidate regions generated in the blind-spot region. The moving object generation section 44 determines and allocates to the moving object particles a movement state based on a predetermined movement state distribution according to the identified category of moving object.

Note that other parts of the configuration and operation of the collision danger determination device according to the fifth exemplary embodiment are similar to those of the first exemplary embodiment and so further explanation thereof is omitted.

Moreover, the method of estimating the category of moving object postulated in the blind-spot region as explained in the above exemplary embodiment may be applied to the third exemplary embodiment. In such cases, the estimated category of moving object and position distributions and velocity distributions corresponding to the categories of moving object may be allocated to moving object data recorded in blind-spot regions.

Explanation follows regarding a collision danger determination device according to a sixth exemplary embodiment. Note that since the configuration of the collision danger determination device according to a sixth exemplary embodiment is similar to that of the first exemplary embodiment, the same reference numerals are allocated and further explanation thereof is omitted.

The sixth exemplary embodiment differs from the first exemplary embodiment in the point that the category of moving object of moving object particles disposed in a blind-spot region is estimated from peripheral data of the blind-spot region based on a training model.

In a moving object generation section 44 of the collision danger determination device according to a sixth exemplary embodiment, a label indicating a category of moving object, such as a vehicle, two-wheeled vehicle or pedestrian, is allocated in the following manner based on the training model to moving object particles of particle generation candidate regions generated from blind-spot regions.

First, in the training model image relationships are learnt between peripheral data of blind-spot regions and categories of moving objects that should be postulated. For example, what should be postulated at a blind-spot region is elucidated by presenting photographs/images of traffic situations to an expert (for example a driving instructor) and/or carrying out a survey by riding around with the expert, and ex-post sensor data is collated to derive peripheral data of blind-spot regions. Then, as illustrated in FIG. 19, a table is generated with each type of peripheral data input class (such as blind-spot generation objects, positional relationships between the vehicle itself and blind-spot regions, presence or absence of a pedestrian crossing, presence or absence of a traffic signal, presence or absence of a stop line, presence or absence of no-overtaking restrictions, speed limit, road size, presence or absence of a crossroad intersection, presence or absence of a sidewalk, presence or absence of a barrier, road line shape and speed of vehicle itself) and with postulated output classes (such as categories of moving object that should be postulated at blind-spot regions).

Figure 20:
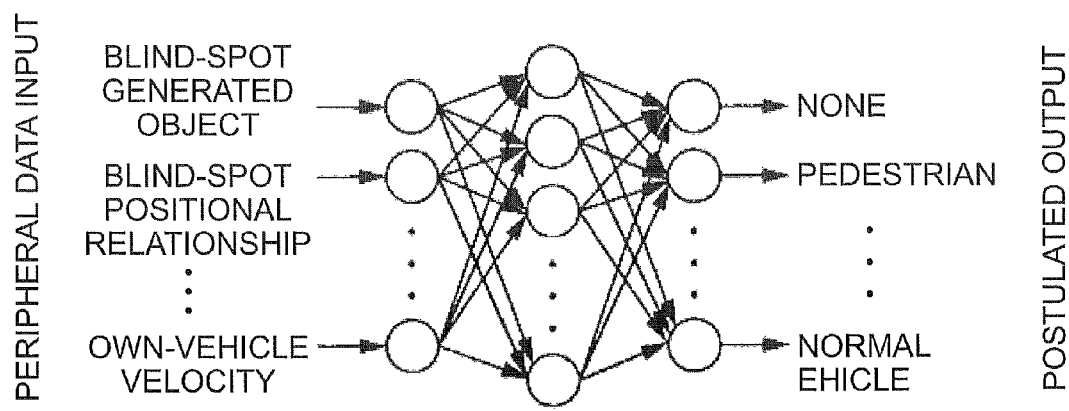
FIG. 20 is a diagram illustrating a neural network.

Then, as illustrated in FIG. 20, a neural network is employed to pre-learn image relationships between each of the classes of blind-spot region peripheral data, and the category of moving object that should be postulated at blind-spot regions. Note that training may be performed employing such means as a fixed-structure linear regression model, a decision tree or a Bayesian network.

A moving object generation section 44 is input with blind-spot region peripheral data obtained from detection results of the environment detection section 40, acquires categories of moving object that should be postulated at blind-spot regions that have been output from the neural network, and allocates a label indicating a category of moving object for moving object particles of particle generation candidate regions generated in the blind-spot region. The moving object generation section 44 also determines the movement state based on a predetermined movement state distribution corresponding to the identified category of moving object, and allocates the movement state to moving object particles.

Note that since other parts of the configuration and operation of the collision danger determination device according to a sixth exemplary embodiment are similar to those of the first exemplary embodiment, further explanation thereof is omitted.

Moreover, the method of estimating the category of moving object postulated in the blind-spot region as explained in the above exemplary embodiment may be applied to the third exemplary embodiment. In such cases, the estimated category of moving object and position distributions and velocity distributions corresponding to the categories of moving object may be allocated to moving object data recorded in blind-spot regions.

Explanation follows regarding a collision danger determination device according to a seventh exemplary embodiment. Note that parts of the configuration similar to those of the first exemplary embodiment are allocated the same reference numerals and further explanation thereof is omitted.

The seventh exemplary embodiment differs from the first exemplary embodiment in the point that a hypothetical movable object is postulated in a blind-spot region where a movable object is possibly present, and moving object particles are disposed therefor.

Figure 21:
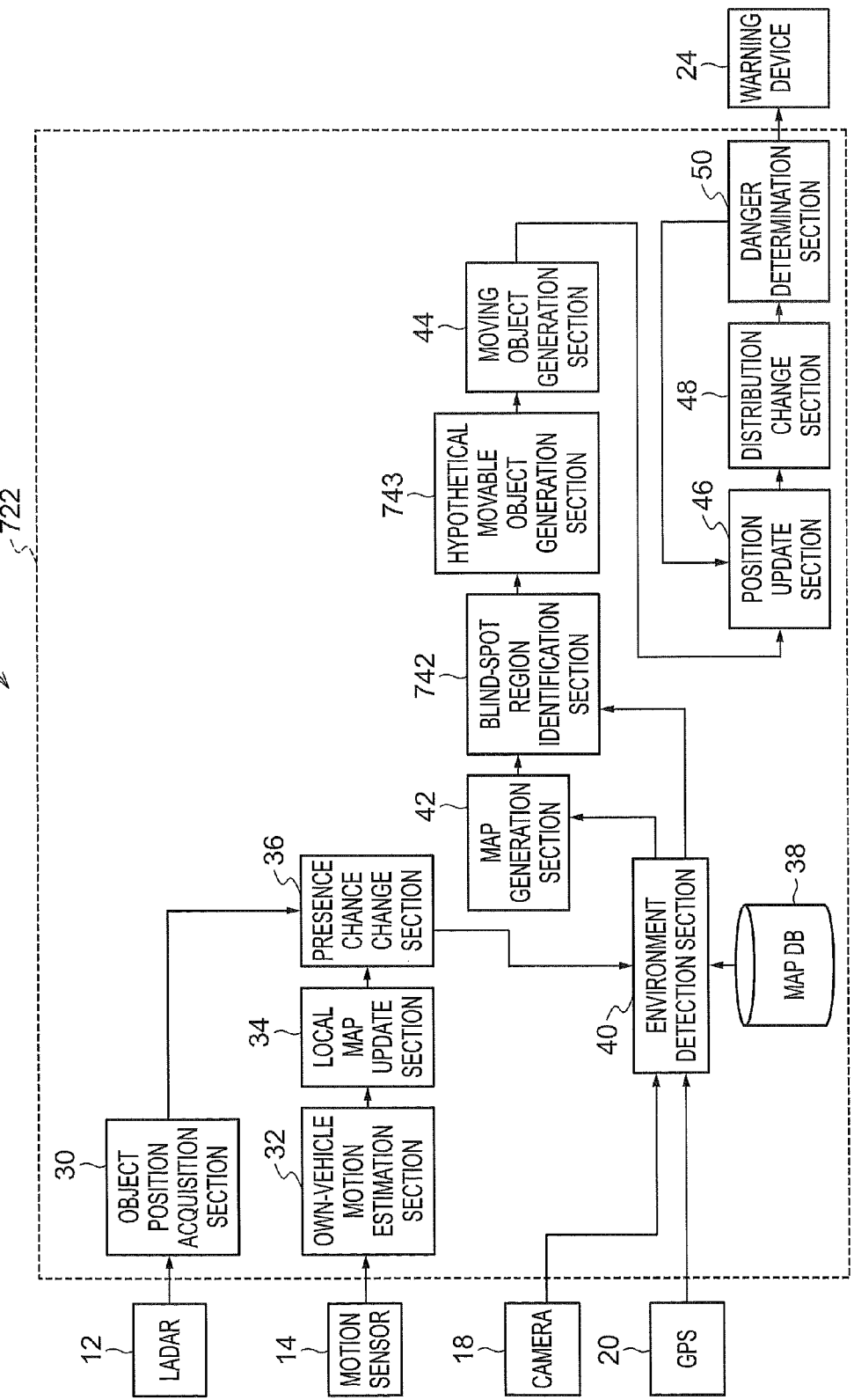
FIG. 21 is a block diagram illustrating a collision danger determination device according to a seventh exemplary embodiment of the present invention.

As illustrated in FIG. 21, a computer 722 of a collision danger determination device 710 according to the seventh exemplary embodiment is equipped with: an object position acquisition section 30; an own-vehicle motion estimation section 32; a local map update section 34; a presence chance change section 36; a map database 38; an environment detection section 40; a map generation section 42; a blind-spot region identification section 742 that identifies a blind-spot region where a movable object is possibly present; a hypothetical movable object generation section 743 that generates, in an identified blind-spot region, plural moving object particles as data representing a hypothetical movable object, applies each of the moving object particles with a movement state corresponding to a movement state distribution of the hypothetical movable object that is postulated, and disposes the moving object particles on a presence probability map so as to represent a distribution of positions of the postulated hypothetical movable object; a moving object generation section 44; a position update section 46; a distribution change section 48; and a danger determination section 50. Note that the hypothetical movable object generation section 743 is an example of a hypothetical movable object generation section and a hypothetical movable object recording section.

Figure 22:
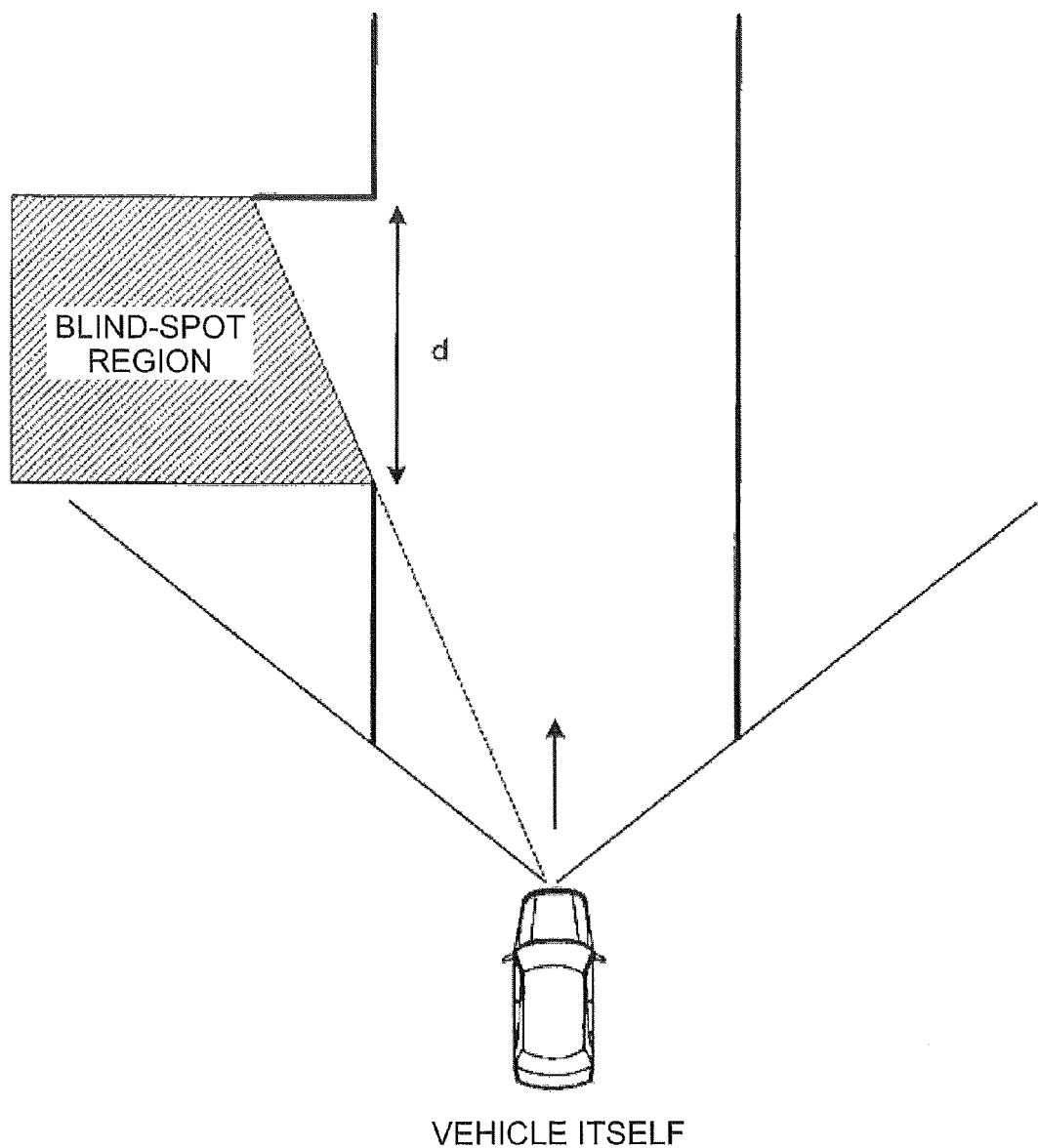
FIG. 22 is an explanatory diagram of blind-spot regions.

The blind-spot region identification section 742, as illustrated in FIG. 22, identifies in local map data a blind-spot region where a movable object is possibly present based on a blind-spot region formed by a stationary object as viewed from the vehicle itself detected by the environment detection section 40 and based on map data. The blind-spot region identification section 742, as illustrated in FIG. 23, sets for the identified blind-spot region a presence probability of a pedestrian and a presence probability of a vehicle based on a blind-spot distance d of the blind-spot region (indicating the road width of the blind-spot region when the blind-spot region is on a road) in a presence probability map. Namely, the blind-spot region identification section 742 sets a pedestrian presence probability to 1.0 when the blind-spot distance d is a threshold value Dx1 or lower, and sets the pedestrian presence probability to 0.8 when the blind-spot distance d is larger than the threshold value Dx1. The blind-spot region identification section 742 is accordingly able to set a higher pedestrian presence probability the smaller the blind-spot distance d. The blind-spot region identification section 742 also sets a vehicle presence probability to 0.2 when the blind-spot distance d is the threshold value Dx1 or lower, and sets the vehicle presence probability to 1.0 when the blind-spot distance d is greater than the threshold value Dx1. The blind-spot region identification section 742 is accordingly able to set a higher vehicle presence probability the greater the blind-spot distance d. Note that the blind-spot distance d of the blind-spot region may be derived using a road width information database of a navigation system.

The hypothetical movable object generation section 743 takes the identified blind-spot region where a movable object is possibly present in the presence probability map as a particle generation candidate region. The hypothetical movable object generation section 743 employs a random number generator to generate and dispose plural moving object particles for the blind-spot region particle generation candidate region of the blind-spot region such that there is a pre-designed total number of particles. Note that the disposition position of the moving object particles may be determined based on a hypothetical movable object position, described later.

The hypothetical movable object generation section 743, as illustrated in FIG. 24, determines, for the moving object particles of the particle generation candidate region generated from the blind-spot region, the category of hypothetical movable object (for example pedestrian or vehicle) based on the above blind-spot distance d, and allocates a label to the moving object particles indicating the determined hypothetical movable object category. For example, the hypothetical movable object generation section 743 determines that the hypothetical movable object category is pedestrian when the blind-spot distance d is a threshold value Dx2 or lower, and the hypothetical movable object generation section 743 determines that the hypothetical movable object type is vehicle when the blind-spot distance d is greater than the threshold value Dx2.

Moreover, the hypothetical movable object generation section 743 computes the position, behavior state and movement state of the hypothetical movable object on the assumption that the hypothetical movable object postulated in the blind-spot region jumps out and collides with the vehicle itself, and sets a distribution of the hypothetical movable object movement state based on the behavior state and movement state of the computed hypothetical movable object.

Figure 25:
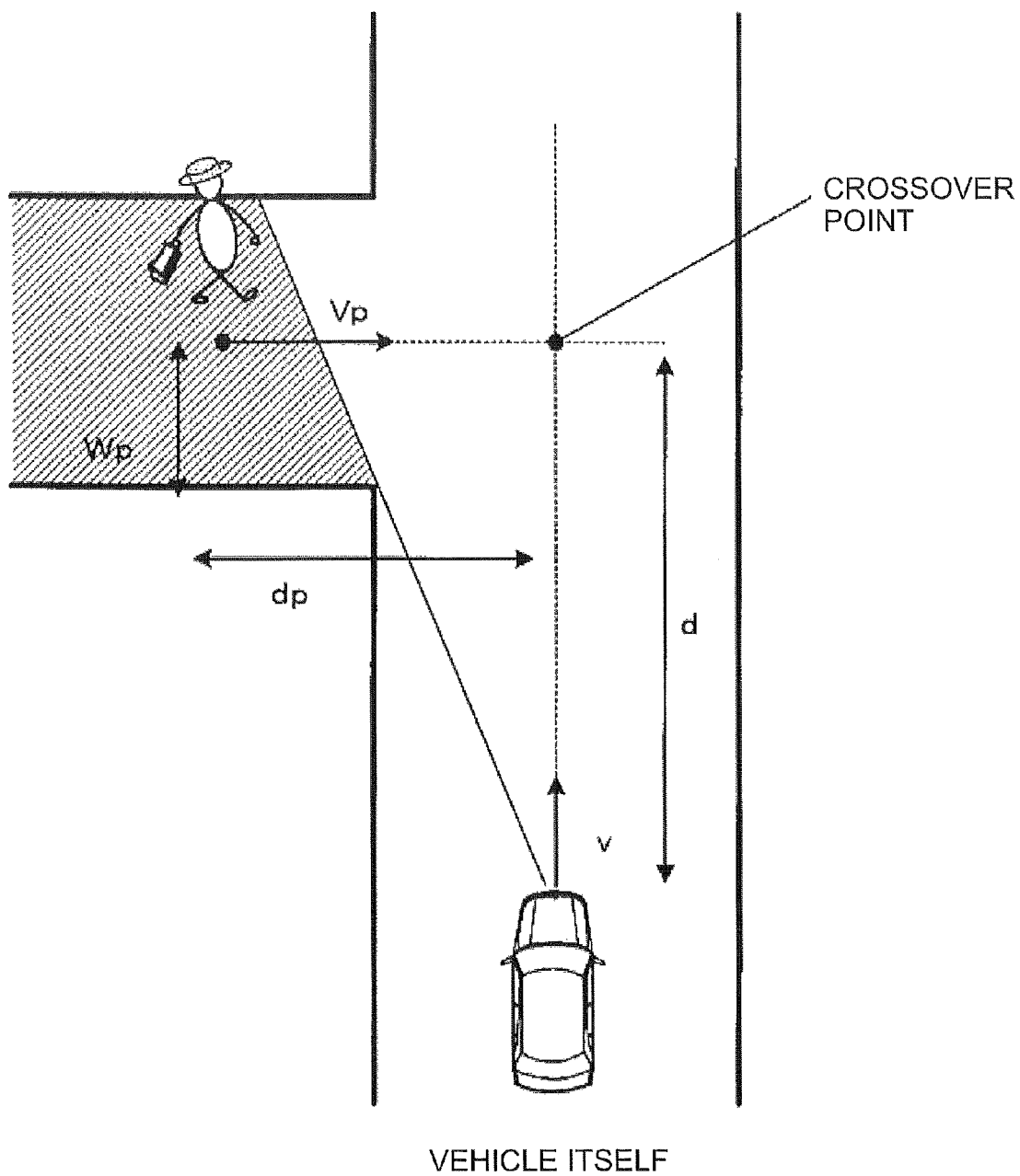
FIG. 25 is an explanatory diagram of a method for computing position and velocity of a postulated hypothetical movable object.

For example, as illustrated in FIG. 25 the jump out position of the hypothetical movable object (for example a pedestrian) is denoted Wp, the jump out velocity is fixed and denoted Vp, the current velocity of the vehicle itself is denoted v, and the distance to the postulated crossover point of the postulated collision with the vehicle itself is denoted d, and time t to when the vehicle itself reaches the crossover point is t=d/v. With vp as the velocity of the hypothetical movable object during movement and dp the distance that can be reached to the crossover point during time t, the dp=vp×t=vp×d/v.

Consequently, while the vehicle itself is travelling in the vicinity of the blind-spot region, at each of the computation times, the hypothetical movable object generation section 743 always disposes moving object particles of the hypothetical movable object based on a position (dp, Wp) in the blind-spot region, and sets the distribution of the moving object particles of the hypothetical movable object based on the velocity Vp.

In other words, the worst case of the moving object jumping out and colliding with the vehicle itself at the crossover point is always postulated when the position and movement state of the hypothetical movable object are being set.

However, postulation of the hypothetical movable object is ended at the point in time when the postulated position (dp, Wp) of the hypothetical movable object becomes just in front of the blind-spot region, and the hypothetical movable object generation section 743 eliminates the moving object particles of the hypothetical movable object.

Identification data for identifying hypothetical movable objects is allocated to the moving object particles. For example, moving object particles are generated with the same allocated identification data for particle generation candidate regions generated for a single hypothetical movable object.

Figure 26:
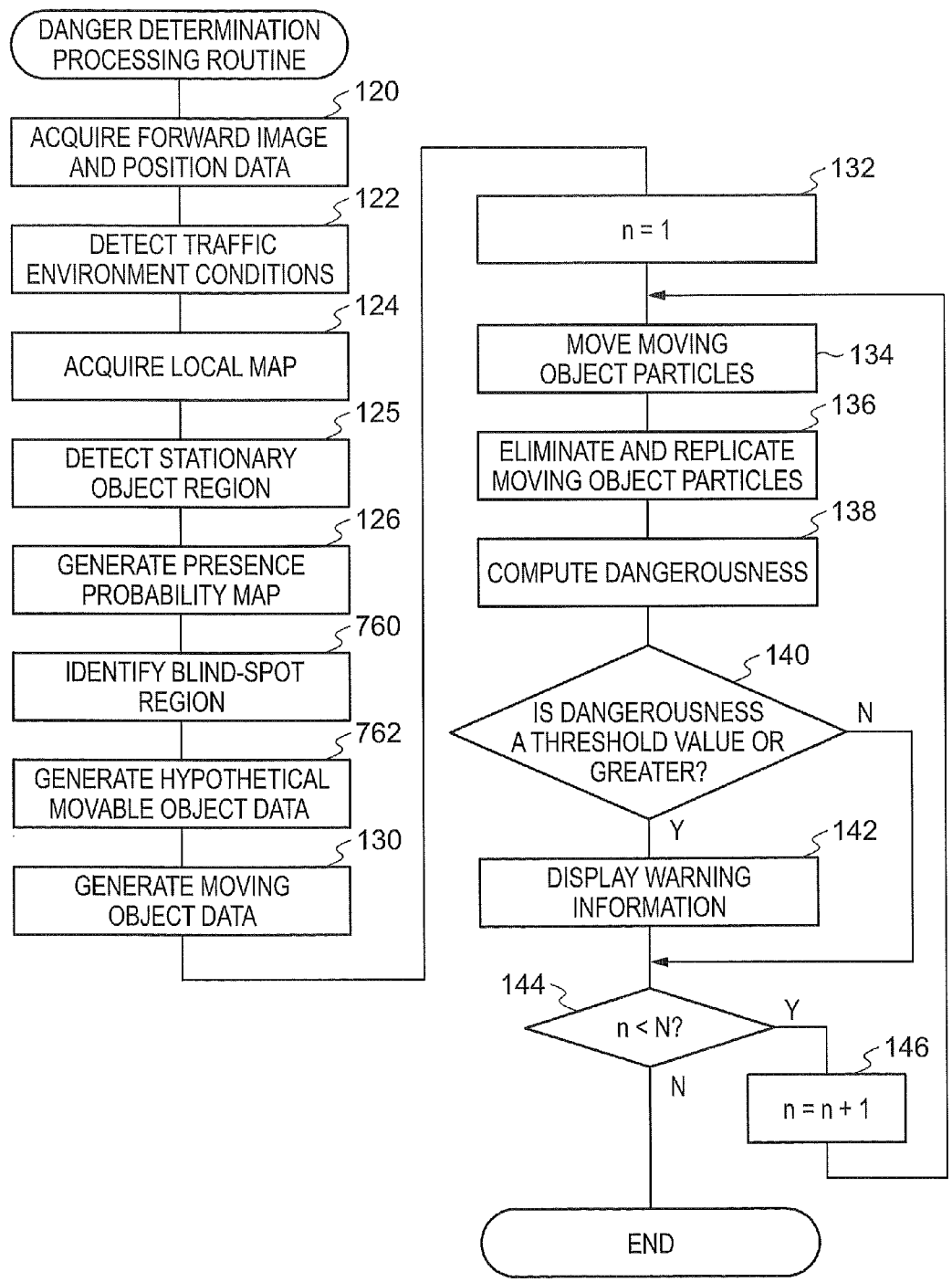
FIG. 26 is a flow chart illustrating contents of a danger determination processing routine in a collision danger determination device according to a seventh exemplary embodiment of the present invention.

Explanation next follows regarding a danger determination processing routine according to the seventh exemplary embodiment, with reference to FIG. 26. Note that parts of the processing similar to those of the first exemplary embodiment are allocated the same reference numerals and detailed explanation thereof is omitted.

First, at step 120, the computer 722 acquires a forward image captured by a camera 18 and the own-vehicle position detected by a GPS device 20. At the next step 122, the computer 722 detects traffic environment conditions including each type of track segments and road attributes in the vicinity of the vehicle itself, and detects peripheral moving objects, behavior states and movement states of the moving object, moving object categories and heights of stationary objects.

Then at step 124, the computer 722 acquires the current local map data obtained by the above local map generation processing routine. Then at step 125, the computer 722 detects regions where stationary objects are present in the local map data acquired at step 124. Then at step 126, the computer 722 generates a presence probability map.

At the next step 760, the computer 722 identifies blind-spot regions where a movable object is possibly present and sets a presence probability of qualifying blind-spot regions in a presence probability map. Then at step 762, the computer 722 sets the qualifying blind-spot regions in the presence probability map as moving object particle generation candidate regions. The computer 722 also determines the category of the hypothetical movable object based on the blind-spot distance of the blind-spot region identified in step 760 and computes the position and movement state of the hypothetical movable object. The computer 722 generates moving object particles for the hypothetical movable object such that there is a pre-set total number of particles, and disposes the moving object particles in the moving object particle generation candidate region according to the position of the computed hypothetical movable object. The computer 722 derives a movement state distribution for the hypothetical movable object based on the computed movement state, and determines respective movement states for each of the moving object particles based on the derived movement state distribution and allocates the movement states to each of the moving object particles.

At step 130, the computer 722 sets moving object particle generation candidate regions for the moving object and the vehicle itself in the presence probability map, generates moving object particles for each of the moving objects including the vehicle itself, and disposes these in the corresponding moving object particle generation candidate region. The 722 also derives a movement state distribution for each of the moving objects, and allocates movement states to each of the moving object particles based on the derived movement state distribution.

At the next step 132, the computer 722 sets an initial value 1 for the variable n that counts the number of prediction steps.

Then at step 134 the computer 722 moves each of the moving object particles including the moving object particles for the hypothetical movable object according to the allocated movement state. At the next step 136 the computer 722 performs elimination and replication of the moving object particles that were moved at step 134 according to the presence probability of the presence probability map, and updates the disposition of the moving object particles. At step 138, the computer 722 computes as a danger of collision respective collision probabilities with the other moving objects based on a superimposition frequency between the moving object particles of the other moving objects and the moving object particles of the vehicle itself that were changed at step 136.

Then at step 140, the computer 722 determines whether or not there is a moving object present with a collision probability computed at step 138 of a threshold value or higher. The computer 722 transitions to step 144 when there is no qualifying moving object present. However when a qualifying moving object is present, at step 142 the computer 722 causes a future position prediction of the qualifying moving object and warning information to be displayed on a warning device 24, and then transitions to step 144.

At step 144, the computer 722 determines whether or not the variable n indicating the prediction step has reached the step number N corresponding to the future prediction time. When the variable n has not yet reached the constant N, the variable n is incremented at step 146, and then processing returns to step 134 and the processing of step 134 onwards is repeated. However, the danger determination processing routine is ended when the variable n has reached the constant N.

Note that other parts of the configuration and operation of the collision danger determination device 710 according to the seventh exemplary embodiment are similar to those of the first exemplary embodiment and further explanation thereof is omitted.

As explained above, according to the collision danger determination device according to the seventh exemplary embodiment, a position distribution for a hypothetical movable object postulated to be present in the blind-spot region is moved based on a postulated movement state distribution, and the position distribution is changed based on the presence probability map in which moving object presence probabilities have been applied to track segment regions, stationary object regions and blind-spot regions. The collision danger determination device is accordingly able to predict with good precision a future position of the hypothetical movable object under various conditions.

The collision danger determination device is also capable of determining a danger of collision on passing a blind-spot that is not obvious in reality by disposing moving object particle for hypothetical movable objects in blind-spot regions.

Figure 27:
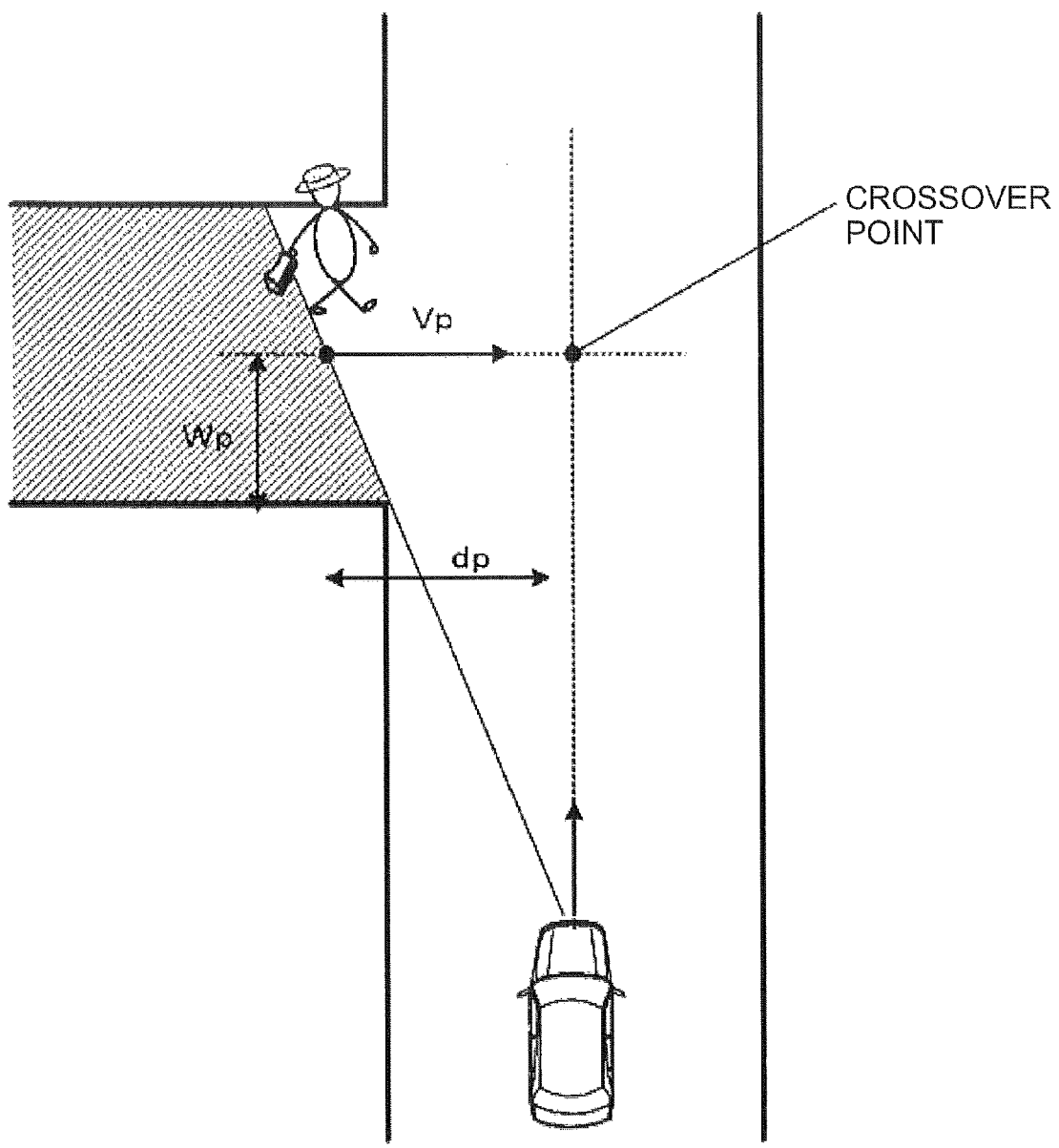
FIG. 27 is an explanatory diagram of a method for computing position and velocity of a postulated hypothetical movable object.

Note that in the above exemplary embodiment, although explanation has been given of an example in which the position of a hypothetical movable object is computed to collide with the vehicle itself at a crossover point when the jumping out velocity is fixed, there is no limitation thereto. As illustrated in FIG. 27, configuration may be made such that at each computation time jumping out is always postulated to occur from the closest position of the blind-spot region to the crossover point, and the position of the hypothetical movable object is computed. For example, when the distance between the blind-spot region and the crossover point is denoted dp, and the jumping out position is denoted Wp, then the position (dp, Wp) is computed as the position of the hypothetical movable object.

Moreover, the method for generating and predicting the hypothetical movable object postulated in the blind-spot region explained in the above exemplary embodiment may be applied to the second exemplary embodiment. In such cases, configuration may be made such that for blind-spot regions formed by a stationary object as viewed from the roadside device, blind-spot regions where a movable object is possibly present are identified, so as to generate hypothetical movable objects postulated in the identified blind-spot regions.

Moreover, the method for generating and predicting the hypothetical movable object postulated in the blind-spot region explained in the above exemplary embodiment may be applied to the third exemplary embodiment. In such cases, a hypothetical movable object generation section 743 records in a presence probability map hypothetical movable object data in an identified blind-spot region where a movable object is possibly present. The position and movement state of the postulated hypothetical movable object is computed by the hypothetical movable object generation section 743, and the position of the hypothetical movable object is represented as a two-dimensional normal distribution in x-y coordinate space centered on the vehicle itself, and hypothetical movable object data expressing the hypothetical movable object position distribution is generated and recorded on the presence probability map. Note that the position of the postulated hypothetical movable object is employed as a position average vector and a position covariance matrix is set based on a size of the predetermined hypothetical movable object. The hypothetical movable object generation section 743 also represents the moving object velocity as a two-dimensional normal distribution in an own-vehicle centered x-y coordinate space based on the movement state of the postulated hypothetical movable object, and allocated to hypothetical movable object data recorded on the presence probability map. Note that the computed hypothetical movable object velocity is employed as a velocity average vector. A velocity covariance matrix is also set using a variance/covariance table according to the pedestrian average velocity such as illustrated in FIG. 8.

Moreover, although explanation in the first exemplary embodiment to the eighth exemplary embodiment is of cases in which the movement state distribution is derived based on the detected behavior state and movement state of the moving object, there is no limitation thereto. A movement state distribution for the moving object may be detected and employed. Moreover, a movement state distribution determined in advance by a designer may be employed for each category of moving object. The variation and direction of the movement state may also be set by employing the results of pedestrian observation (the behavior state such as the orientation and gait), and a movement state distribution may also be derived by employing a predetermined average velocity for each category of moving object.

Moreover, explanation has been given of an example in which the presence probability representing the likelihood of a moving object being present is employed to generate the presence probability map, however configuration may be made such that a presence probability representing the unlikelihood of a moving object being present is employed.

Moreover, explanation has been given of cases in which the detection results of a motion sensor are employed as examples of cases for estimating the motion of the vehicle itself, however there is no limitation thereto. The motion of the vehicle itself may be estimated by integrating over time detection results of a LADAR. Moreover, for example, the motion of the vehicle itself may be estimated by employing detection results of the vehicle itself using a GPS device. Moreover, the motion of the vehicle itself may be estimated using detection results of a combination of LADAR, motion sensor and/or GPS device.

Moreover, explanation has been given of examples of cases in which the position of an object is detected by using a LADAR to scan forwards using a laser, however there is no limitation thereto. Configuration may be made such that the position of an object is detected by scanning forwards with electromagnetic waves such as milliwaves.

Moreover, although explanation has been given of examples of cases in which the position of an object in front of the vehicle itself is detected by LADAR, there is no limitation thereto. Configuration may be made, for example, in which the position of an object in front of the vehicle itself is detected in forward images captured by a stereo camera.

The blind-spot regions as viewed from the vehicle itself may also be identified with stereoscopic technology using a camera.

It is also possible to provide a program of the present invention stored on a storage medium.

A computer readable medium according to the present invention is stored with a program that causes a computer to function as: a moving object detection section that detects a position and a behavior state or a movement state of a moving object in a detection target range; a region detection section that detects plural categories of regions of track segment and regions of stationary object in the detection target range; a map generation section that generates a presence probability map in which a presence probability expressing a presence likelihood or presence unlikelihood of a moving object is applied to the track segment regions and the stationary object regions detected by the region detection section; a moving object recording section that generates a position distribution and a movement state distribution of the moving object based on the position and the behavior state or the movement state of the moving object detected by the moving object detection section, and records the distributions on the presence probability map; and a prediction section that moves the moving object position distribution based on the moving object movement state distribution, changes the moved position distribution based on presence probabilities of the presence probability map, and predicts a future position distribution of the moving object on the presence probability map.

Moreover, a computer readable medium according to the present invention is stored with a program that causes a computer to function as a region detection section that detects plural categories of regions of track segment and regions of stationary object in a detection target range; a map generation section that generates a presence probability map in which a presence probability expressing a presence likelihood or presence unlikelihood of a moving object is applied to the track segment regions and the stationary object regions detected by the region detection section; a blind-spot region identification section that identifies a blind-spot region in the detection target range where a movable object might be present; a hypothetical movable object generation section that generates a hypothetical movable object postulated to be present in a blind-spot region identified by the blind-spot region identification section; a hypothetical movable object recording section that, for the hypothetical movable object generated by the hypothetical movable object generation section, postulates a position and a behavior state or movement state of the hypothetical movable object, generates a position distribution and a movement state distribution of the hypothetical movable object, and records the distributions on the presence probability map; and a prediction section that moves the hypothetical movable object position distribution based on the hypothetical movable object movement state distribution, changes the moved position distribution based on presence probabilities of the presence probability map, and predicts a future position distribution of the hypothetical movable object on the presence probability map.

The entire disclosure of Japanese Patent Application 2010-201214 is incorporated by reference in the present specification.

All cited documents, patent applications and technical standards mentioned in the present specification are incorporated by reference in the present specification to the same extent as if the individual cited documents, patent applications and technical standards were specifically and individually incorporated by reference in the present specification.

EXPLANATION OF THE REFERENCE NUMERALS 10, 210, 710 collision danger determination device
12 LADAR
14 motion sensor
18 camera
20 GPS device
22, 222, 722 computer
32 own-vehicle motion estimation section
34 local map update section
36, 326 presence chance change section
38 map database
40 environment detection section
42 map generation section
44 moving object generation section
46 position update section
46 moving object generation section
48 distribution change section
50, 250 danger determination section
742 blind-spot region identification section
743 hypothetical movable object generation section

The invention claimed is:

1. A moving object prediction device comprising:
a processor including:
a moving object detection module to detect a position, and a behavior state or a movement state, of a moving object in a detection target range;
a region detection module to detect a plurality of track segment regions and stationary object regions in the detection target range;
a map generation module configured to generate a presence probability map in which a presence probability expressing a presence likelihood or presence unlikelihood of a moving object is applied to the track segment regions and the stationary object regions detected by the region detection module;
a moving object recording module configured to generate a position distribution represented by a plurality of moving object particles and a movement state distribution of the moving object based on the position and the behavior state or the movement state of the moving object detected by the moving object detection module, and record the distributions on the presence probability map; and
a prediction module configured to move the position distribution based on the movement state distribution, change the moved position distribution based on presence probabilities of the presence probability map, and predict a future position distribution of the moving object on the presence probability map.

2. The moving object prediction device of claim 1, wherein:
the prediction module is configured to move each of the plurality of moving object particles representing the position distribution, based on the movement state distribution, change the position distribution by eliminating the moved moving object particles and replicating other moving object particles based on presence probabilities of the presence probability map, and predict a future position distribution of the moving object on the presence probability map.

3. The moving object prediction device of claim 1, wherein:
the position distribution is represented by a probability distribution; and
the prediction module is configured to move the probability distribution representing the position distribution based on the movement state distribution, change the position distribution by weighting the moved probability distribution based on presence probabilities of the presence probability map, and predict a future position distribution of the moving object on the presence probability map.

4. The moving object prediction device of claim 1, wherein:
the region detection module further detects track segment categories and stationary object heights; and
the map generation module is configured to generate the presence probability map by applying the presence probability corresponding to the track segment categories to the track segment regions, and applying the presence probability corresponding to the stationary object heights to the stationary object regions.

5. The moving object prediction device of claim 1, wherein:
the moving object detection module detects a category of the moving object together with the position of the moving object in the detection target range and the behavior state or the movement state of the moving object; and
the map generation module is configured to generate the presence probability map with the presence probability applied for the category of the moving object.

6. The moving object prediction device of claim 1, wherein:
the prediction module is configured to predict the future position distribution on the presence probability map by moving the position distribution, based on the movement state distribution and change the moved position distribution based on the magnitude of the presence probability applied to a region corresponding to the position distribution, or based on the difference or ratio between the presence probability applied to the region corresponding to the position distribution and a prior presence probability applied to the region corresponding to the position distribution prior to moving.

7. The moving object prediction device of claim 1, further comprising a dangerousness computation module configured to compute a danger of collision between a vehicle installed with the device and a moving object, based on a position distribution of the vehicle and a position distribution of the moving object, which have been predicted by the prediction module.

8. The moving object prediction device of claim 1, wherein the moving object recording module is configured to:
identify a blind-spot region formed by a stationary object as viewed from a vehicle installed with the device based on the detected stationary object region and the position of the vehicle;
generate the position distribution and the movement state distribution of the moving object postulated to be present in the identified blind-spot region; and
record the generated position distribution and movement state distribution in the identified blind-spot region on the presence probability map.

9. The moving object prediction device of claim 8, wherein the moving object recording module is configured to:
identify the blind-spot region based on the detected stationary object region and the position of the vehicle;
estimate a category of the moving object postulated to be present in the identified blind-spot region based on a movement environment at a periphery of the identified blind-spot region, out of movement environments detected by a movement environment detection module that detect the movement environments of moving objects in the detection target range, or based on a position of the identified blind-spot region, and generate the position distribution and the movement state distribution of the moving object in the blind-spot region; and
record the generated position distribution and the generated movement state distribution of the moving object in the identified blind-spot region on the presence probability map.

10. The moving object prediction device of claim 1, further comprising:
an object position acquisition module to detect a position of an object present in the detection target range as viewed from a vehicle installed with the device;
a motion estimation module to estimate the motion of the vehicle;
a map update module configured to repeatedly update map data as currently viewed from the vehicle by updating the map data from a previous update time based on a current motion of the vehicle estimated by the motion estimation module; and
a stationary object recording module configured to, each time the map data is updated by the map update module, record in the updated map data a stationary object presence in a block corresponding to a position of an object currently detected by the object position detection module, and reduce a record of stationary object presence in each block corresponding to between the vehicle and the current detected object position, wherein
the region detection module detects the stationary object regions based on the map data.

11. A hypothetical movable object prediction device comprising:
a processor including:
a region detection module to detect a plurality of track segment regions and stationary object regions in a detection target range;
a map generation module configured to generate a presence probability map in which a presence probability expressing a presence likelihood or presence unlikelihood of a moving object is applied to the track segment regions and the stationary object regions detected by the region detection module;
a blind-spot region identification module configured to identify a blind-spot region in the detection target range where a movable object might be present;
a hypothetical movable object generation module configured to generate a hypothetical movable object postulated to be present in the blind-spot region identified by the blind-spot region identification module;
a hypothetical movable object recording module configured to, for the hypothetical movable object generated by the hypothetical movable object generation module, postulate a position and a behavior state or movement state of the hypothetical movable object, generate a position distribution represented by a plurality of moving object particles and a movement state distribution of the hypothetical movable object, and record the distributions on the presence probability map; and a prediction module configured to move the position distribution based on the movement state distribution, change the moved position distribution based on presence probabilities of the presence probability map, and predicts a future position distribution of the hypothetical movable object on the presence probability map.

12. The hypothetical movable object prediction device of claim 11, wherein the blind-spot region identification module together with identifying the blind-spot region is also configured to set a presence probability of the blind-spot region in the presence probability map based on a distance of the blind-spot region.

13. The hypothetical movable object prediction device of claim 11, wherein, for the hypothetical movable object generated by the hypothetical movable object generation module, the hypothetical movable object recording module is configured to postulate a position of the hypothetical movable object and a behavior state or movement state of the hypothetical movable object, and also postulate the category of the hypothetical movable object based on a distance of the blind spot region in which the hypothetical movable object might be present, generate a position distribution and a movement state distribution for the hypothetical movable object and record the distributions on the presence probability map.

14. The hypothetical movable object prediction device of claim 11, wherein for the hypothetical movable object generated by the hypothetical movable object generation module, the hypothetical movable object recording module is configured to postulate a position of the hypothetical movable object and a behavior state or a movement state of the hypothetical movable object, such that the hypothetical movable object will collide a vehicle installed with the device when the hypothetical movable object jumps out from the blind-spot region, generate a position distribution and a movement state distribution for the hypothetical movable object and record the distributions on the presence probability map.

15. The hypothetical movable object prediction device of claim 11, wherein, for the hypothetical movable object generated by the hypothetical movable object generation module, the hypothetical movable object recording module is configured to:

postulate as a position of the hypothetical movable object a position in the blind-spot region closest to the position of postulated collision with a vehicle installed with the device when the hypothetical movable object jumps out from the blind-spot region, and postulate a behavior state or a movement state of the hypothetical movable object such that the hypothetical movable object will collide with the vehicle when the hypothetical movable object jumps out from the blind-spot region; and generate a position distribution and a movement state distribution for the hypothetical movable object and record the distributions on the presence probability map.

16. A non-transitory computer-readable storage medium that stores a program that causes a computer to function as:

a moving object detection module to detect a position and a behavior state or a movement state of a moving object in a detection target range;

a region detection module to detect a plurality of track segment regions and stationary object regions in the detection target range;

a map generation module configured to generate a presence probability map in which a presence probability expressing a presence likelihood or presence unlikelihood of a moving object is applied to the track segment regions and the stationary object regions detected by the region detection module;

a moving object recording module configured to generate a position distribution represented by a plurality of moving object particles and a movement state distribution of the moving object based on the position and the behavior state or the movement state of the moving object detected by the moving object detection module, and record the distributions on the presence probability map; and a prediction module configured to move the position distribution based on the movement state distribution, change the moved position distribution based on presence probabilities of the presence probability map, and predict a future position distribution of the moving object on the presence probability map.

17. A moving object prediction method comprising:

detecting, by a moving object detection module, a position, and a behavior state or a movement state of a moving object and detecting, by a region detection module, a plurality of track segment regions and stationary object regions in the detection target range;

generating, by a map generation module, a presence probability map in which a presence probability expressing a presence likelihood or presence unlikelihood of a moving object is applied to the detected track segment regions and the detected stationary object regions; and generating, by a moving object recording module, a position distribution represented by a plurality of moving object particles and a movement state distribution of the moving object based on the position and the behavior state or the movement state of the detected moving object and recording the distributions on the presence probability map, and also, by a prediction module, moving the position distribution based on the movement state distribution, changing the moved position distribution based on presence probabilities of the presence probability map, and predicting a future position distribution of the moving object on the presence probability map.

18. A non-transitory computer-readable storage medium that stores a program that causes a computer to function as:

a region detection module to detect a plurality of track segment regions and stationary object regions in a detection target range;

a map generation module configured to generate a presence probability map in which a presence probability expressing a presence likelihood or presence unlikelihood of a moving object is applied to the track segment regions and the stationary object regions detected by the region detection module;

a blind-spot region identification module configured to identify a blind-spot region in the detection target range where a movable object might be present;

a hypothetical movable object generation module configured to generate a hypothetical movable object postulated to be present in the blind-spot region identified by the blind-spot region identification module;

a hypothetical movable object recording module configured to, for the hypothetical movable object generated by the hypothetical movable object generation module, postulate a position, and a behavior state or movement state of the hypothetical movable object, generate a position distribution represented by a plurality of moving object particles and a movement state distribution of the hypothetical movable object, and record the distributions on the presence probability map; and a prediction module configured to move the position distribution based on the movement state distribution, change the moved position distribution based on presence probabilities of the presence probability map, and predict a future position distribution of the hypothetical movable object on the presence probability map.

19. A hypothetical movable object prediction method comprising:

detecting, by a region detection module, a plurality of track segment regions and stationary object regions in a detection target range;

generating, by a map generation module, a presence probability map in which a presence probability expressing a presence likelihood or presence unlikelihood of a moving object is applied to the detected track segment regions and the detected stationary object regions;

identifying, by a blind-spot region identification module, a blind-spot region in the detection target range where a movable object might be present;

generating, by a hypothetical movable object generation module, a hypothetical movable object postulated to be present in the identified blind-spot region;

postulating, by a hypothetical movable object recording module, for the generated hypothetical movable object, a position and a behavior state or movement state of the hypothetical movable object, generating a position distribution and a movement state distribution of the hypothetical movable object, and recording the distributions on the presence probability map; and by a prediction module, moving the position distribution based on the movement state distribution, changing the moved position distribution based on presence probabilities of the presence probability map, and predicting a future position distribution of the hypothetical movable object on the presence probability map.

* * * * *